US012699447B2

(12) United States Patent
Pelis et al.

(10) Patent No.: US 12,699,447 B2
(45) Date of Patent: *Aug. 4, 2026

(54) EXTERNAL USER INTERFACE FOR HEAD WORN COMPUTING

(71) Applicant: Mentor Acquisition One, LLC, Plantation, FL (US)

(72) Inventors: Nicholas Benjamin Pelis, San Francisco, CA (US); Preston Douglas Brown, San Francisco, CA (US); Sean Thomas Mostajo O'Hara, San Mateo, CA (US); Robert Michael Lohse, Palo Alto, CA (US); Andrew Carl Heisey, Walnut Creek, CA (US)

(73) Assignee: Mentor Acquisition One, LLC, Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/988,584

(22) Filed: Dec. 19, 2024

(65) Prior Publication Data

US 2025/0147588 A1      May 8, 2025

Related U.S. Application Data

(63) Continuation of application No. 18/531,531, filed on Dec. 6, 2023, now Pat. No. 12,216,821, which is a
(Continued)

(51) Int. Cl.
*G06F 3/01* (2006.01)
*A63F 13/00* (2014.01)
(Continued)

(52) U.S. Cl.
CPC ............ *G06F 3/014* (2013.01); *A63F 13/00* (2013.01); *G06F 1/163* (2013.01); *G06F 3/011* (2013.01); *G06F 3/0304* (2013.01); *G06F*

*3/03542* (2013.01); *G06F 3/03545* (2013.01); *G06F 3/03547* (2013.01); *G06F 3/038* (2013.01);
(Continued)

(58) Field of Classification Search
CPC ............ G06F 3/011–017; G06F 3/033; G06F 3/0346–03547; G06F 3/038–0386; G06F 3/0416–041662; G06F 3/0488–04886; G06F 1/163; G06F 2200/1637; G06F 2203/04104; G06F 2203/04106; G06F 2203/04808; G02B 27/0172;
(Continued)

(56) References Cited

U.S. PATENT DOCUMENTS

| | | | |
|---|---|---|---|
| 4,852,988 | A | 8/1989 | Velez |
| D327,674 | S | 7/1992 | Kuo |

(Continued)

FOREIGN PATENT DOCUMENTS

| | | | |
|---|---|---|---|
| CA | 2316473 | A1 | 1/2001 |
| CA | 2362895 | A1 | 12/2002 |

(Continued)

OTHER PUBLICATIONS

Final Office Action mailed Apr. 28, 2022, for U.S. Appl. No. 17/222,904, filed Apr. 5, 2021, twelve pages.
(Continued)

*Primary Examiner* — Nathan Danielsen
(74) *Attorney, Agent, or Firm* — Vista IP Law Group, LLP

(57) ABSTRACT

Aspects of the present invention relate to user interface control of a head-worn computer.

20 Claims, 15 Drawing Sheets

Wireless Finger Controller 1202

Housing 1212

Contact Sensor 1302

Related U.S. Application Data continuation of application No. 17/222,904, filed on Apr. 5, 2021, now Pat. No. 11,886,638, which is a continuation of application No. 14/806,385, filed on Jul. 22, 2015, now Pat. No. 11,003,246.

(51) Int. Cl.

| | |
|---|---|
| *G06F 1/16* | (2006.01) |
| *G06F 3/03* | (2006.01) |
| *G06F 3/0354* | (2013.01) |
| *G06F 3/038* | (2013.01) |
| *G06F 3/04883* | (2022.01) |
| *G02B 27/01* | (2006.01) |

(52) U.S. Cl.
CPC ........ *G06F 3/0383* (2013.01); *G06F 3/04883* (2013.01); *G02B 2027/014* (2013.01); *G02B 27/017* (2013.01); *G06F 2203/0331* (2013.01)

(58) Field of Classification Search
CPC ........ G02B 2027/014; G06K 9/00335–00355; G06K 9/00375–00389
See application file for complete search history.

(56) References Cited

U.S. PATENT DOCUMENTS

| | | | |
|---|---|---|---|
| D352,930 S | 11/1994 | Tsuji | |
| D375,748 S | 11/1996 | Hartman | |
| D376,790 S | 12/1996 | Taylor | |
| 5,638,092 A | 6/1997 | Eng et al. | |
| D392,959 S | 3/1998 | Edwards | |
| 5,767,841 A | 6/1998 | Hartman | |
| 5,788,195 A | 8/1998 | Rice | |
| D410,638 S | 6/1999 | Loughnane | |
| 6,297,749 B1 | 10/2001 | Smith | |
| D451,892 S | 12/2001 | Carrere | |
| D460,071 S | 7/2002 | Sheehan | |
| 6,433,760 B1 | 8/2002 | Vaissie | |
| 6,491,391 B1 | 12/2002 | Blum et al. | |
| D470,144 S | 2/2003 | Li | |
| 6,535,182 B2 | 3/2003 | Stanton | |
| D473,871 S | 4/2003 | Santos | |
| D478,052 S | 8/2003 | Thomas, Jr. | |
| 6,642,945 B1 | 11/2003 | Sharpe | |
| 6,717,075 B1 | 4/2004 | Stavely | |
| 6,771,294 B1 | 8/2004 | Pulli | |
| 6,847,336 B1 | 1/2005 | Lemelson | |
| 6,943,754 B2 | 9/2005 | Aughey | |
| 6,956,558 B1 | 10/2005 | Rosenberg | |
| D512,027 S | 11/2005 | Sarasjoki | |
| D513,233 S | 12/2005 | Stauffer | |
| 6,977,776 B2 | 12/2005 | Volkenandt et al. | |
| D514,525 S | 2/2006 | Stauffer | |
| D529,467 S | 10/2006 | Rose | |
| D541,226 S | 4/2007 | Wakisaka | |
| D559,793 S | 1/2008 | Fan | |
| 7,347,551 B2 | 3/2008 | Fergason et al. | |
| D571,816 S | 6/2008 | Corcoran | |
| 7,380,936 B2 | 6/2008 | Howell | |
| 7,401,918 B2 | 7/2008 | Howell | |
| 7,481,531 B2 | 1/2009 | Howell | |
| 7,488,294 B2 | 2/2009 | Torch | |
| 7,500,747 B2 | 3/2009 | Howell | |
| 7,677,723 B2 | 3/2010 | Howell | |
| 7,771,046 B2 | 8/2010 | Howell | |
| 7,777,723 B2 | 8/2010 | Namiki | |
| 7,792,552 B2 | 9/2010 | Thomas | |
| 7,806,525 B2 | 10/2010 | Howell | |
| D630,213 S | 1/2011 | Fidali | |
| D631,881 S | 2/2011 | Quinn | |
| D631,882 S | 2/2011 | Odgers | |
| 8,223,024 B1 | 7/2012 | Petrou | |
| 8,228,315 B1 | 7/2012 | Starner | |
| 8,235,529 B1 | 8/2012 | Raffle | |
| 8,337,013 B2 | 12/2012 | Howell | |
| D680,112 S | 4/2013 | Monahan | |
| 8,430,507 B2 | 4/2013 | Howell | |
| 8,434,863 B2 | 5/2013 | Howell | |
| D689,862 S | 9/2013 | Liu | |
| D690,684 S | 10/2013 | Lee | |
| D696,668 S | 12/2013 | Chen | |
| 8,611,015 B2 | 12/2013 | Wheeler | |
| D697,914 S | 1/2014 | Bates | |
| 8,638,498 B2 | 1/2014 | Bohn et al. | |
| 8,696,113 B2 | 4/2014 | Lewis | |
| 8,743,052 B1 | 6/2014 | Keller | |
| 8,770,742 B2 | 7/2014 | Howell | |
| 8,787,006 B2 | 7/2014 | Golko | |
| D716,813 S | 11/2014 | Deng | |
| D718,309 S | 11/2014 | Roberts | |
| 8,922,530 B2 | 12/2014 | Pance | |
| 8,929,589 B2 | 1/2015 | Publicover et al. | |
| 8,982,471 B1 | 3/2015 | Starner | |
| 9,010,929 B2 | 4/2015 | Lewis | |
| D728,573 S | 5/2015 | Deng | |
| 9,024,842 B1 | 5/2015 | Prada Gomez | |
| 9,046,999 B1 | 6/2015 | Teller | |
| 9,063,563 B1 | 6/2015 | Gray | |
| 9,064,436 B1 | 6/2015 | Patel | |
| 9,122,054 B2 | 9/2015 | Osterhout | |
| 9,141,194 B1 | 9/2015 | Keyes | |
| 9,158,116 B1 | 10/2015 | Osterhout | |
| D743,963 S | 11/2015 | Osterhout | |
| 9,176,582 B1 | 11/2015 | Johnson | |
| 9,223,136 B1 | 12/2015 | Braun | |
| 9,229,233 B2 | 1/2016 | Osterhout | |
| 9,274,338 B2 | 3/2016 | Robbins et al. | |
| 9,286,728 B2 | 3/2016 | Osterhout | |
| 9,292,082 B1 | 3/2016 | Patel | |
| 9,292,973 B2 | 3/2016 | Bar-zeev et al. | |
| D753,114 S | 4/2016 | Osterhout | |
| 9,323,325 B2 | 4/2016 | Perez et al. | |
| 9,324,189 B2 | 4/2016 | Vaughn | |
| D756,363 S | 5/2016 | Mathis | |
| 9,374,655 B1 | 6/2016 | Lee | |
| 9,400,390 B2 | 7/2016 | Osterhout | |
| 9,401,540 B2 | 7/2016 | Osterhout | |
| 9,423,842 B2 | 8/2016 | Osterhout | |
| 9,523,856 B2 | 12/2016 | Osterhout | |
| 9,529,195 B2 | 12/2016 | Osterhout | |
| 9,529,199 B2 | 12/2016 | Osterhout | |
| 9,529,385 B2 | 12/2016 | Connor | |
| 9,570,273 B2 | 2/2017 | Watson et al. | |
| 9,575,321 B2 | 2/2017 | Osterhout | |
| 9,682,622 B2 | 6/2017 | Kim | |
| 9,690,763 B1 | 6/2017 | Lee | |
| D794,637 S | 8/2017 | Osterhout | |
| 9,720,505 B2 | 8/2017 | Gribetz et al. | |
| 9,810,906 B2 | 11/2017 | Osterhout | |
| 9,939,934 B2 | 4/2018 | Osterhout | |
| 10,013,053 B2 | 7/2018 | Cederlund et al. | |
| 10,025,379 B2 | 7/2018 | Drake et al. | |
| 11,003,246 B2 | 5/2021 | Pelis et al. | |
| 11,886,638 B2 | 1/2024 | Pelis | |
| 2001/0017614 A1 | 8/2001 | Hara | |
| 2002/0024675 A1 | 2/2002 | Foxlin | |
| 2002/0148655 A1 | 10/2002 | Cho | |
| 2003/0030597 A1 | 2/2003 | Geist | |
| 2003/0142065 A1 | 7/2003 | Pahlavan | |
| 2003/0218760 A1 | 11/2003 | Tomasi | |
| 2003/0234823 A1 | 12/2003 | Sato | |
| 2004/0003453 A1 | 1/2004 | Urakawa | |
| 2004/0024287 A1 | 2/2004 | Patton | |
| 2004/0027312 A1 | 2/2004 | Owada | |
| 2004/0032392 A1 | 2/2004 | Chi | |
| 2004/0046736 A1 | 3/2004 | Pryor | |
| 2004/0080541 A1 | 4/2004 | Saiga | |
| 2004/0130522 A1 | 7/2004 | Lin | |
| 2004/0150631 A1 | 8/2004 | Fleck | |
| 2004/0224765 A1 | 11/2004 | Martinez | |
| 2005/0156915 A1 | 7/2005 | Fisher | |
| 2005/0195172 A1 | 9/2005 | Lu | |
| 2006/0017654 A1 | 1/2006 | Romo | |

(56)  References Cited

U.S. PATENT DOCUMENTS

| | | |
|---|---|---|
| 2006/0023158 A1 | 2/2006 | Howell et al. |
| 2006/0047339 A1 | 3/2006 | Brown |
| 2006/0088195 A1 | 4/2006 | Tykowski |
| 2006/0132457 A1 | 6/2006 | Rimas-ribikauskas |
| 2006/0132924 A1 | 6/2006 | Mimran |
| 2006/0170652 A1 | 8/2006 | Bannai |
| 2006/0178827 A1 | 8/2006 | Aoyama |
| 2006/0279549 A1 | 12/2006 | Zhang |
| 2006/0288233 A1 | 12/2006 | Kozlay |
| 2007/0003168 A1 | 1/2007 | Oliver |
| 2007/0004451 A1 | 1/2007 | C. Anderson |
| 2007/0038960 A1 | 2/2007 | Rekimoto |
| 2007/0058868 A1 | 3/2007 | Seino |
| 2007/0069976 A1 | 3/2007 | Willins |
| 2007/0075989 A1 | 4/2007 | Cohen |
| 2007/0120836 A1 | 5/2007 | Yamaguchi |
| 2007/0132662 A1 | 6/2007 | Morita |
| 2007/0153639 A1 | 7/2007 | Lafever |
| 2007/0178950 A1 | 8/2007 | Lewis |
| 2007/0229458 A1 | 10/2007 | Moon |
| 2007/0236450 A1 | 10/2007 | Colgate |
| 2008/0002262 A1 | 1/2008 | Chirieleison |
| 2008/0005702 A1 | 1/2008 | Skourup |
| 2008/0066973 A1 | 3/2008 | Furuki |
| 2008/0121441 A1 | 5/2008 | Sheets |
| 2008/0186255 A1 | 8/2008 | Cohen |
| 2009/0183929 A1 | 7/2009 | Zhang |
| 2009/0251441 A1 | 10/2009 | Edgecomb |
| 2010/0001572 A1 | 1/2010 | Masunaga |
| 2010/0085325 A1 | 4/2010 | King-smith |
| 2010/0134848 A1 | 6/2010 | Lynggaard |
| 2010/0182561 A1 | 7/2010 | Ikeda |
| 2010/0194682 A1 | 8/2010 | Orr |
| 2010/0231505 A1 | 9/2010 | Iwata |
| 2010/0309097 A1 | 12/2010 | Raviv |
| 2011/0006982 A1 | 1/2011 | Rhee |
| 2011/0109587 A1 | 5/2011 | Ferencz |
| 2011/0199305 A1 | 8/2011 | Suh |
| 2011/0211056 A1 | 9/2011 | Publicover et al. |
| 2011/0213664 A1 | 9/2011 | Osterhout |
| 2011/0221658 A1 | 9/2011 | Haddick |
| 2011/0221672 A1 | 9/2011 | Osterhout |
| 2011/0227820 A1 | 9/2011 | Haddick |
| 2011/0285638 A1 | 11/2011 | Harris |
| 2012/0021806 A1 | 1/2012 | Maltz |
| 2012/0026088 A1 | 2/2012 | Goran |
| 2012/0049759 A1 | 3/2012 | Pezzutti |
| 2012/0062445 A1 | 3/2012 | Haddick |
| 2012/0062594 A1 | 3/2012 | Campbell |
| 2012/0068913 A1 | 3/2012 | Bar-zeev |
| 2012/0113514 A1 | 5/2012 | Rodman |
| 2012/0133885 A1 | 5/2012 | Howell |
| 2012/0139915 A1 | 6/2012 | Muikaichi |
| 2012/0212499 A1 | 8/2012 | Haddick |
| 2012/0218301 A1 | 8/2012 | Miller |
| 2012/0229248 A1 | 9/2012 | Parshionikar |
| 2012/0249741 A1 | 10/2012 | Maciocci |
| 2012/0256944 A1 | 10/2012 | Crumly |
| 2012/0302347 A1 | 11/2012 | Nicholson |
| 2012/0327040 A1 | 12/2012 | Simon |
| 2013/0002545 A1 | 1/2013 | Heinrich |
| 2013/0002724 A1 | 1/2013 | Heinrich |
| 2013/0009907 A1 | 1/2013 | Rosenberg |
| 2013/0027341 A1 | 1/2013 | Mastandrea |
| 2013/0038729 A1 | 2/2013 | Chang |
| 2013/0077147 A1 | 3/2013 | Efimov |
| 2013/0120224 A1 | 5/2013 | Cajigas |
| 2013/0135244 A1 | 5/2013 | Lynch |
| 2013/0222270 A1 | 8/2013 | Winkler |
| 2013/0234914 A1 | 9/2013 | Fujimaki |
| 2013/0249849 A1 | 9/2013 | Wong |
| 2013/0249946 A1 | 9/2013 | Kimura |
| 2013/0259238 A1 | 10/2013 | Xiang |
| 2013/0288761 A1 | 10/2013 | Santos Paiva Ferraz Conceicao |
| 2013/0300637 A1 | 11/2013 | Smits |
| 2013/0336528 A1 | 12/2013 | Itani |
| 2014/0062841 A1 | 3/2014 | Ishikawa |
| 2014/0063473 A1 | 3/2014 | Pasolini |
| 2014/0078043 A1 | 3/2014 | Kim |
| 2014/0111838 A1 | 4/2014 | Han |
| 2014/0115520 A1 | 4/2014 | Itani |
| 2014/0165000 A1 | 6/2014 | Fleizach |
| 2014/0168716 A1 | 6/2014 | King |
| 2014/0184496 A1 | 7/2014 | Gribetz |
| 2014/0191942 A1 | 7/2014 | Kobayashi |
| 2014/0195918 A1 | 7/2014 | Friedlander |
| 2014/0204062 A1 | 7/2014 | Goto |
| 2014/0240103 A1 | 8/2014 | Lake |
| 2014/0240223 A1 | 8/2014 | Lake |
| 2014/0266988 A1 | 9/2014 | Fisher |
| 2014/0285631 A1 | 9/2014 | Janky |
| 2014/0306866 A1 | 10/2014 | Miller |
| 2014/0320383 A1 | 10/2014 | Goto |
| 2014/0320389 A1 | 10/2014 | Scavezze |
| 2014/0361976 A1 | 12/2014 | Osman |
| 2014/0363797 A1 | 12/2014 | Hu |
| 2015/0012581 A1 | 1/2015 | Kim |
| 2015/0016777 A1 | 1/2015 | Abovitz |
| 2015/0040040 A1 | 2/2015 | Balan |
| 2015/0085333 A1 | 3/2015 | Theytaz |
| 2015/0123887 A1 | 5/2015 | Shadle |
| 2015/0128251 A1 | 5/2015 | Yoon |
| 2015/0133193 A1 | 5/2015 | Stotler |
| 2015/0141774 A1 | 5/2015 | Ogawa et al. |
| 2015/0143297 A1 | 5/2015 | Wheeler |
| 2015/0156716 A1 | 6/2015 | Raffle |
| 2015/0168731 A1 | 6/2015 | Robbins |
| 2015/0185476 A1 | 7/2015 | Lee |
| 2015/0202962 A1 | 7/2015 | Habashima |
| 2015/0205119 A1 | 7/2015 | Osterhout |
| 2015/0205132 A1 | 7/2015 | Osterhout |
| 2015/0205348 A1 | 7/2015 | Nortrup |
| 2015/0205349 A1 | 7/2015 | Nortrup |
| 2015/0205351 A1 | 7/2015 | Osterhout |
| 2015/0205373 A1 | 7/2015 | Osterhout |
| 2015/0205378 A1 | 7/2015 | Osterhout |
| 2015/0205384 A1 | 7/2015 | Osterhout |
| 2015/0205385 A1 | 7/2015 | Osterhout |
| 2015/0205387 A1 | 7/2015 | Osterhout |
| 2015/0205388 A1 | 7/2015 | Osterhout |
| 2015/0205401 A1 | 7/2015 | Osterhout |
| 2015/0205402 A1 | 7/2015 | Osterhout |
| 2015/0205566 A1 | 7/2015 | Osterhout |
| 2015/0206173 A1 | 7/2015 | Nortrup |
| 2015/0212324 A1 | 7/2015 | Osterhout |
| 2015/0212327 A1 | 7/2015 | Osterhout |
| 2015/0212647 A1 | 7/2015 | Kim |
| 2015/0213584 A1 | 7/2015 | Ishikawa |
| 2015/0226966 A1 | 8/2015 | Osterhout |
| 2015/0226967 A1 | 8/2015 | Osterhout |
| 2015/0228099 A1 | 8/2015 | Osterhout |
| 2015/0228119 A1 | 8/2015 | Osterhout |
| 2015/0228120 A1 | 8/2015 | Osterhout |
| 2015/0229019 A1 | 8/2015 | Osterhout |
| 2015/0234456 A1 | 8/2015 | Cho |
| 2015/0241963 A1 | 8/2015 | Nortrup |
| 2015/0241964 A1 | 8/2015 | Nortrup |
| 2015/0241965 A1 | 8/2015 | Nortrup |
| 2015/0241966 A1 | 8/2015 | Nortrup |
| 2015/0243039 A1 | 8/2015 | Holz |
| 2015/0260986 A1 | 9/2015 | Nortrup |
| 2015/0277116 A1 | 10/2015 | Richards |
| 2015/0277120 A1 | 10/2015 | Border |
| 2015/0277559 A1 | 10/2015 | Vescovi |
| 2015/0293738 A1 | 10/2015 | Lee |
| 2015/0302646 A1 | 10/2015 | Osterhout |
| 2015/0302647 A1 | 10/2015 | Osterhout |
| 2015/0309317 A1 | 10/2015 | Osterhout |
| 2015/0309534 A1 | 10/2015 | Osterhout |
| 2015/0309995 A1 | 10/2015 | Osterhout |
| 2015/0338661 A1 | 11/2015 | Osterhout |
| 2015/0338916 A1 | 11/2015 | Priyantha |
| 2015/0346496 A1 | 12/2015 | Haddick |
| 2015/0346511 A1 | 12/2015 | Osterhout |

(56) References Cited

U.S. PATENT DOCUMENTS

| | | |
|---|---|---|
| 2015/0355468 A1 | 12/2015 | Osterhout |
| 2015/0356772 A1 | 12/2015 | Osterhout |
| 2015/0356775 A1 | 12/2015 | Osterhout |
| 2015/0356776 A1 | 12/2015 | Osterhout |
| 2015/0356777 A1 | 12/2015 | Osterhout |
| 2015/0356778 A1 | 12/2015 | Osterhout |
| 2015/0356779 A1 | 12/2015 | Osterhout |
| 2015/0362977 A1 | 12/2015 | Doniwa |
| 2015/0363975 A1 | 12/2015 | Osterhout |
| 2015/0381609 A1 | 12/2015 | Dadu et al. |
| 2016/0018640 A1 | 1/2016 | Haddick |
| 2016/0018641 A1 | 1/2016 | Haddick |
| 2016/0018642 A1 | 1/2016 | Haddick |
| 2016/0018645 A1 | 1/2016 | Haddick |
| 2016/0018646 A1 | 1/2016 | Osterhout |
| 2016/0018647 A1 | 1/2016 | Osterhout |
| 2016/0018648 A1 | 1/2016 | Osterhout |
| 2016/0018649 A1 | 1/2016 | Osterhout |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0018654 A1 | 1/2016 | Haddick |
| 2016/0019715 A1 | 1/2016 | Haddick |
| 2016/0019719 A1 | 1/2016 | Osterhout |
| 2016/0021304 A1 | 1/2016 | Osterhout |
| 2016/0025974 A1 | 1/2016 | Osterhout |
| 2016/0025977 A1 | 1/2016 | Osterhout |
| 2016/0025979 A1 | 1/2016 | Border |
| 2016/0025980 A1 | 1/2016 | Osterhout |
| 2016/0026211 A1 | 1/2016 | Luna |
| 2016/0026239 A1 | 1/2016 | Border |
| 2016/0027211 A1 | 1/2016 | Osterhout |
| 2016/0027414 A1 | 1/2016 | Osterhout |
| 2016/0034742 A1 | 2/2016 | Kim et al. |
| 2016/0056647 A1 | 2/2016 | Choi |
| 2016/0062118 A1 | 3/2016 | Osterhout |
| 2016/0078278 A1 | 3/2016 | Moore |
| 2016/0080897 A1 | 3/2016 | Moore |
| 2016/0085072 A1 | 3/2016 | Haddick |
| 2016/0085278 A1 | 3/2016 | Osterhout |
| 2016/0098086 A1 | 4/2016 | Li |
| 2016/0109709 A1 | 4/2016 | Osterhout |
| 2016/0109713 A1 | 4/2016 | Osterhout |
| 2016/0116738 A1 | 4/2016 | Osterhout |
| 2016/0116745 A1 | 4/2016 | Osterhout |
| 2016/0131904 A1 | 5/2016 | Border |
| 2016/0131911 A1 | 5/2016 | Border |
| 2016/0132082 A1 | 5/2016 | Border |
| 2016/0133201 A1 | 5/2016 | Border |
| 2016/0140766 A1 | 5/2016 | Balachandreswaran |
| 2016/0161746 A1 | 6/2016 | Ahearn |
| 2016/0161747 A1 | 6/2016 | Osterhout |
| 2016/0170207 A1 | 6/2016 | Haddick |
| 2016/0171769 A1 | 6/2016 | Haddick |
| 2016/0187658 A1 | 6/2016 | Osterhout |
| 2016/0202946 A1 | 7/2016 | Osterhout |
| 2016/0246055 A1 | 8/2016 | Border |
| 2016/0286203 A1 | 9/2016 | Border |
| 2016/0299569 A1 | 10/2016 | Fisher |
| 2016/0329634 A1 | 11/2016 | Osterhout |
| 2016/0350581 A1 | 12/2016 | Manuel et al. |
| 2016/0375306 A1 | 12/2016 | Gu |
| 2017/0017323 A1 | 1/2017 | Yu |
| 2017/0024035 A1 | 1/2017 | Pelis |
| 2017/0031395 A1 | 2/2017 | Osterhout |
| 2017/0075155 A1 | 3/2017 | Oikawa |
| 2017/0100664 A1 | 4/2017 | Osterhout |
| 2017/0123492 A1 | 5/2017 | Marggraff |
| 2017/0153672 A1 | 6/2017 | Shin |
| 2017/0160812 A1 | 6/2017 | Park |
| 2017/0185214 A1 | 6/2017 | Kojima |
| 2017/0187855 A1 | 6/2017 | Hoellwarth |
| 2017/0293351 A1 | 10/2017 | Li |
| 2017/0322416 A1 | 11/2017 | Osterhout |
| 2017/0322627 A1 | 11/2017 | Osterhout |
| 2017/0322641 A1 | 11/2017 | Osterhout |
| 2017/0324860 A1 | 11/2017 | Novet |
| 2017/0336872 A1 | 11/2017 | Osterhout |
| 2017/0345194 A1 | 11/2017 | Park |
| 2017/0358139 A1 | 12/2017 | Balan |
| 2018/0011571 A1 | 1/2018 | Colgate |
| 2018/0108179 A1 | 4/2018 | Tomlin |
| 2018/0113504 A1 | 4/2018 | Osterhout |
| 2018/0113524 A1 | 4/2018 | Osterhout |
| 2018/0113590 A1 | 4/2018 | Osterhout |
| 2018/0253159 A1 | 9/2018 | Ramaiah |
| 2024/0103622 A1 | 3/2024 | Pelis |

FOREIGN PATENT DOCUMENTS

| | | |
|---|---|---|
| CA | 2388766 A1 | 12/2003 |
| EP | 2490130 A1 | 8/2012 |
| EP | 2674834 A2 | 12/2013 |
| JP | 09179062 A | 7/1997 |
| WO | 2014145166 A2 | 9/2014 |
| WO | 2016044035 A1 | 3/2016 |

OTHER PUBLICATIONS

Final Office Action mailed Dec. 2, 2019, for U.S. Appl. No. 14/806,385, filed Jul. 22, 2015, eight pages.

Final Office Action mailed Jan. 5, 2023, for U.S. Appl. No. 17/222,904, filed Apr. 5, 2021, eight pages.

Final Office Action mailed Nov. 26, 2018, for U.S. Appl. No. 14/806,385, filed Jul. 22, 2015, seven pages.

Final Office Action mailed Oct. 6, 2020, for U.S. Appl. No. 14/806,385, filed Jul. 22, 2015, eight pages.

Final Office Action mailed Sep. 14, 2023, for U.S. Appl. No. 17/222,904, filed Apr. 5, 2021, nine pages.

Final Office Action mailed Sep. 8, 2017, for U.S. Appl. No. 14/806,385, filed Jul. 22, 2015, seven pages.

International Search Report mailed Oct. 13, 2016, for PCT Application No. PCT/US2016/42440, two pages.

Jacob, R. "Eye Tracking in Advanced Interface Design", Virtual Environments and Advanced Interface Design, Oxford University Press, Inc. (Jun. 1995).

Logbar Inc., "Ring: Shortcut Everything", https://www.kickstarter.com/projects/1761670738/ring-shortcut-everything, Dec. 2014, 22 pages.

Mastandrea. "Mycestro, The Next Generation 3D Mouse," https://www.kickstarter.com/projects/mycestro/mycestrotm-the-next-generation-3d-mouse. Dec. 2014, 22 pages.

Non-Final Office Action mailed Apr. 17, 2020, for U.S. Appl. No. 14/806,385, filed Jul. 22, 2015, nine pages.

Non-Final Office Action mailed Aug. 4, 2022, for U.S. Appl. No. 17/222,904, filed Apr. 5, 2021, seven pages.

Non-Final Office Action mailed Dec. 8, 2021, for U.S. Appl. No. 17/222,904, filed Apr. 5, 2021, six pages.

Non-Final Office Action mailed Feb. 22, 2017, for U.S. Appl. No. 14/806,385, filed Jul. 22, 2015, six pages.

Non-Final Office Action mailed Jul. 18, 2024, for U.S. Appl. No. 18/531,531, filed Dec. 6, 2023, fourteen pages.

Non-Final Office Action mailed Jun. 25, 2019, for U.S. Appl. No. 14/806,385, filed Jul. 22, 2015, seven pages.

Non-Final Office Action mailed Mar. 26, 2018, for U.S. Appl. No. 14/806,385, filed Jul. 22, 2015, seven pages.

Non-Final Office Action mailed May 10, 2023, for U.S. Appl. No. 17/222,904, filed Apr. 5, 2021, seven pages.

Notice of Allowance mailed Jan. 6, 2021, for U.S. Appl. No. 14/806,385, filed Jul. 22, 2015, eight pages.

Notice of Allowance mailed Nov. 19, 2024, for U.S. Appl. No. 18/531,531, filed Dec. 6, 2023, seven pages.

Notice of Allowance mailed Nov. 6, 2023, for U.S. Appl. No. 17/222,904, filed Apr. 5, 2021, eight pages.

Rolland, J. et al., "High-resolution inset head- mounted display", Optical Society of America, vol. 37, No. 19, Applied Optics, (Jul. 1, 1998).

Tanriverdi, V. et al. (Apr. 2000). "Interacting With Eye Movements

(56) References Cited

OTHER PUBLICATIONS

In Virtual Environments," Department of Electrical Engineering and Computer Science, Tufts University, Medford, MA 02155, USA, Proceedings of the SIGCHI conference on Human Factors in Computing Systems, eight pages.

U.S. Appl. No. 14/185,958, filed Feb. 21, 2014.
U.S. Appl. No. 14/185,968, filed Feb. 21, 2014.
U.S. Appl. No. 14/185,972, filed Feb. 21, 2014.
U.S. Appl. No. 14/185,979, filed Feb. 21, 2014.
U.S. Appl. No. 14/462,415, filed Aug. 18, 2014.
U.S. Appl. No. 14/517,014, filed Oct. 27, 2014.
U.S. Appl. No. 14/517,031, filed Oct. 17, 2014.
U.S. Appl. No. 14/517,536, filed Oct. 17, 2014.
U.S. Appl. No. 15/185,970, filed Feb. 21, 2014.
U.S. Appl. No. 15/334,412, filed Oct. 26, 2016.
U.S. Appl. No. 15/347,958, filed Nov. 10, 2016.
U.S. Appl. No. 15/352,745, filed Nov. 16, 2016.
U.S. Appl. No. 15/446,025, filed Mar. 1, 2017.
U.S. Appl. No. 15/489,000, filed Apr. 17, 2017.
U.S. Appl. No. 15/680,917, filed Aug. 18, 2017.
U.S. Appl. No. 15/785,505, filed Oct. 17, 2017.
Walton, Z. "Wear This Smartphone Controller on Your Finger," http://www.webpronews.com/wear-this-smartphone-controller-on-your-finger-2012-06, 5 pages.
Yoshida, A. et al., "Design and Applications of a High Resolution Insert Head Mounted Display", (Jun. 1994).
"Genius Ring Mice," http://www.geniusnet.com/Genius/wSite/productCompare/compare.jsp, Dec. 23, 2014, one page.
"Meet Nod, the Bluetooth Ring That Wants to Replace your Mouse," http://www.pcmag.com/article2/0.2817.2457238.00.asp, Apr. 29, 2014, 6 pages.

Surface not
Present
504

200

200

Surface
Present
502

Twist mode change
508

200

Button push
mode change
510

Dual Mirror with Laser Raster Projector 902

Raster Pattern Projected UI 904

102

Programmable Hot Buttons on Side 1008

Programmable Hot Buttons on Front Face 1010

Fixed Hot (e.g. clear display) 1012

Touch Screen 1018

HWC Controller 1004

Virtual Active Layer 1014

Steering Wheel 1002

Housing 1212

Actuator 1208a

Trackpad 1204

Wireless Finger Controller 1202

Actuator 1208b

Finger Strap 1210

EXTERNAL USER INTERFACE FOR HEAD WORN COMPUTING

CROSS-REFERENCE TO RELATED APPLICATIONS

This application is a continuation of U.S. Non-Provisional application Ser. No. 18/531,531, filed on Dec. 6, 2023, which is a continuation of U.S. Non-Provisional application Ser. No. 17/222,904, filed on Apr. 5, 2021, now U.S. Pat. No. 11,886,638, which claims the benefit of U.S. Non-Provisional application Ser. No. 14/806,385, filed Jul. 22, 2015, now U.S. Pat. No. 11,003,246, issued May 11, 2021, the contents of which are incorporated herein by reference in its entirety.

BACKGROUND

Field of the Invention

This invention relates to head worn computing. More particularly, this invention relates to external user interfaces used in connection with to head worn computing.

Description of Related Art

Wearable computing systems have been developed and are beginning to be commercialized. Many problems persist in the wearable computing field that need to be resolved to make them meet the demands of the market.

SUMMARY

Aspects of the present invention relate to the systems and methods of interacting with a head-worn computer.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures.

While the invention has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present invention relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
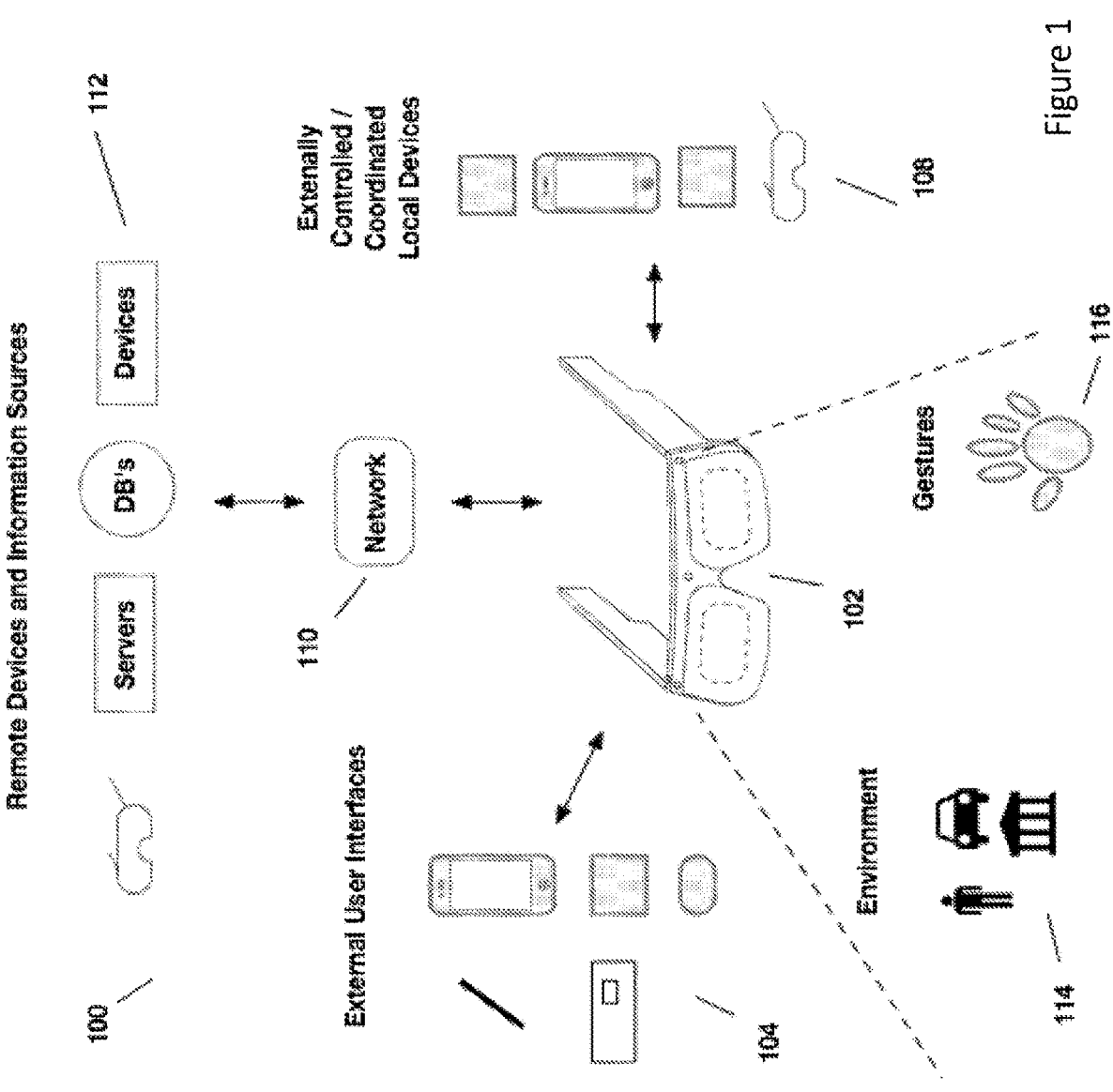
FIG. 1 illustrates a head worn computing system in accordance with the principles of the present invention.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCOS, DLP), emissive displays (e.g. OLED, LED), hologram, TIR waveguides, and the like. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI, such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
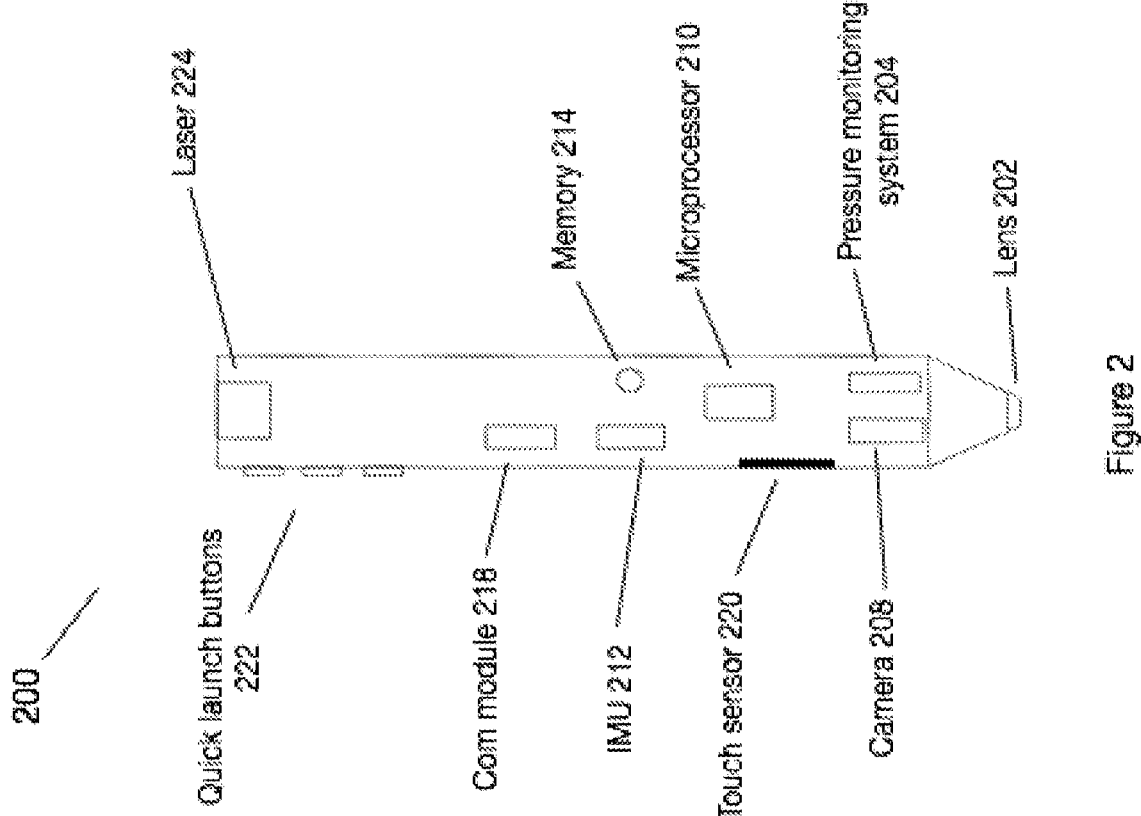
FIG. 2 illustrates an external user interface in accordance with the principles of the present invention.

Referring to FIG. 2, we now turn to describe a particular external user interface 104, referred to generally as a pen 200. The pen 200 is a specially designed external user interface 104 and can operate as a user interface, such as to many different styles of HWC 102. The pen 200 generally follows the form of a conventional pen, which is a familiar user handled device and creates an intuitive physical interface for many of the operations to be carried out in the HWC system 100. The pen 200 may be one of several user interfaces 104 used in connection with controlling operations within the HWC system 100. For example, the HWC 102 may watch for and interpret hand gestures 116 as control signals, where the pen 200 may also be used as a user interface with the same HWC 102. Similarly, a remote keyboard may be used as an external user interface 104 in concert with the pen 200. The combination of user interfaces or the use of just one control system generally depends on the operation(s) being executed in the HWC's system 100.

While the pen 200 may follow the general form of a conventional pen, it contains numerous technologies that enable it to function as an external user interface 104. FIG. 2 illustrates technologies comprised in the pen 200. As can be seen, the pen 200 may include a camera 208, which is arranged to view through lens 202. The camera may then be focused, such as through lens 202, to image a surface upon which a user is writing or making other movements to interact with the HWC 102. There are situations where the pen 200 will also have an ink, graphite, or other system such that what is being written can be seen on the writing surface. There are other situations where the pen 200 does not have such a physical writing system so there is no deposit on the writing surface, where the pen would only be communicating data or commands to the HWC 102. The lens configuration is described in greater detail herein. The function of the camera is to capture information from an unstructured writing surface such that pen strokes can be interpreted as intended by the user. To assist in the predication of the intended stroke path, the pen 200 may include a sensor, such as an IMU 212. Of course, the IMU could be included in the pen 200 in its separate parts (e.g. gyro, accelerometer, etc.) or an IMU could be included as a single unit. In this instance, the IMU 212 is used to measure and predict the motion of the pen 200. In turn, the integrated microprocessor 210 would take the IMU information and camera information as inputs and process the information to form a prediction of the pen tip movement.

The pen 200 may also include a pressure monitoring system 204, such as to measure the pressure exerted on the lens 202. As will be described in greater herein, the pressure measurement can be used to predict the user's intention for changing the weight of a line, type of a line, type of brush, click, double click, and the like. In embodiments, the pressure sensor may be constructed using any force or pressure measurement sensor located behind the lens 202, including for example, a resistive sensor, a current sensor, a capacitive sensor, a voltage sensor such as a piezoelectric sensor, and the like.

The pen 200 may also include a communications module 218, such as for bi-directional communication with the HWC 102. In embodiments, the communications module 218 may be a short distance communication module (e.g. Bluetooth). The communications module 218 may be security matched to the HWC 102. The communications module 218 may be arranged to communicate data and commands to and from the microprocessor 210 of the pen 200. The microprocessor 210 may be programmed to interpret data generated from the camera 208, IMU 212, and pressure sensor 204, and the like, and then pass a command onto the HWC 102 through the communications module 218, for example. In another embodiment, the data collected from any of the input sources (e.g. camera 108, IMU 212, pressure sensor 104) by the microprocessor may be communicated by the communication module 218 to the HWC 102, and the HWC 102 may perform data processing and prediction of the user's intention when using the pen 200. In yet another embodiment, the data may be further passed on through a network 110 to a remote device 112, such as a server, for the data processing and prediction. The commands may then be communicated back to the HWC 102 for execution (e.g. display writing in the glasses display, make a selection within the UI of the glasses display, control a remote external device 112, control a local external device 108), and the like. The pen may also include memory 214 for long or short term uses.

The pen 200 may also include a number of physical user interfaces, such as quick launch buttons 222, a touch sensor 220, and the like. The quick launch buttons 222 may be adapted to provide the user with a fast way of jumping to a software application in the HWC system 100. For example, the user may be a frequent user of communication software packages (e.g. email, text, Twitter, Instagram, Facebook, Google+, and the like), and the user may program a quick launch button 222 to command the HWC 102 to launch an application. The pen 200 may be provided with several quick launch buttons 222, which may be user programmable or factory programmable. The quick launch button 222 may be programmed to perform an operation. For example, one of the buttons may be programmed to clear the digital display of the HWC 102. This would create a fast way for the user to clear the screens on the HWC 102 for any reason, such as for example to better view the environment. The quick launch button functionality will be discussed in further detail below. The touch sensor 220 may be used to take gesture style input from the user. For example, the user may be able to take a single finger and run it across the touch sensor 220 to affect a page scroll.

The pen 200 may also include a laser pointer 224. The laser pointer 224 may be coordinated with the IMU 212 to coordinate gestures and laser pointing. For example, a user may use the laser 224 in a presentation to help with guiding the audience with the interpretation of graphics and the IMU 212 may, either simultaneously or when the laser 224 is off, interpret the user's gestures as commands or data input.

Figures 3A, 3B, 3C:
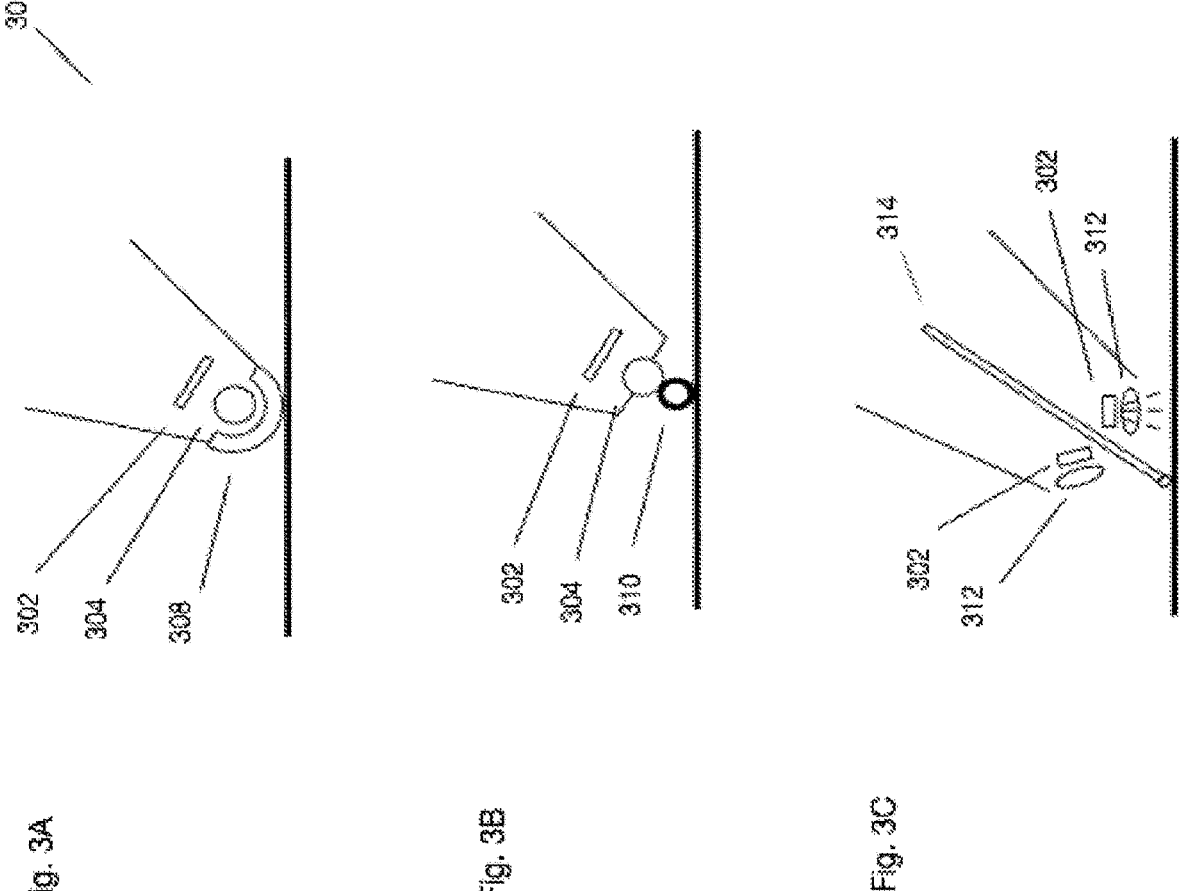
FIGS. 3a to 3c illustrate distance control systems in accordance with the principles of the present invention.

FIGS. 3A-C illustrate several embodiments of lens and camera arrangements 300 for the pen 200. One aspect relates to maintaining a constant distance between the camera and the writing surface to enable the writing surface to be kept in focus for better tracking of movements of the pen 200 over the writing surface. Another aspect relates to maintaining an angled surface following the circumference of the writing tip of the pen 200 such that the pen 200 can be rolled or partially rolled in the user's hand to create the feel and freedom of a conventional writing instrument.

FIG. 3A illustrates an embodiment of the writing lens end of the pen 200. The configuration includes a ball lens 304, a camera or image capture surface 302, and a domed cover lens 308. In this arrangement, the camera views the writing surface through the ball lens 304 and dome cover lens 308. The ball lens 304 causes the camera to focus such that the camera views the writing surface when the pen 200 is held in the hand in a natural writing position, such as with the pen 200 in contact with a writing surface. In embodiments, the ball lens 304 should be separated from the writing surface to obtain the highest resolution of the writing surface at the camera 302. In embodiments, the ball lens 304 is separated by approximately 1 to 3 mm. In this configuration, the domed cover lens 308 provides a surface that can keep the ball lens 304 separated from the writing surface at a constant distance, such as substantially independent of the angle used to write on the writing surface. For instance, in embodiments the field of view of the camera in this arrangement would be approximately 60 degrees.

The domed cover lens, or other lens 308 used to physically interact with the writing surface, will be transparent or transmissive within the active bandwidth of the camera 302. In embodiments, the domed cover lens 308 may be spherical or other shape and comprised of glass, plastic, sapphire, diamond, and the like. In other embodiments where low resolution imaging of the surface is acceptable. The pen 200 can omit the domed cover lens 308 and the ball lens 304 can be in direct contact with the surface.

FIG. 3B illustrates another structure where the construction is somewhat similar to that described in connection with FIG. 3A; however this embodiment does not use a dome cover lens 308, but instead uses a spacer 310 to maintain a predictable distance between the ball lens 304 and the writing surface, wherein the spacer may be spherical, cylindrical, tubular or other shape that provides spacing while allowing for an image to be obtained by the camera 302 through the lens 304. In a preferred embodiment, the spacer 310 is transparent. In addition, while the spacer 310 is shown as spherical, other shapes such as an oval, doughnut shape, half sphere, cone, cylinder or other form may be used.

FIG. 3C illustrates yet another embodiment, where the structure includes a post 314, such as running through the center of the lensed end of the pen 200. The post 314 may be an ink deposition system (e.g. ink cartridge), graphite deposition system (e.g. graphite holder), or a dummy post whose purpose is mainly only that of alignment. The selection of the post type is dependent on the pen's use. For instance, in the event the user wants to use the pen 200 as a conventional ink depositing pen as well as a fully functional external user interface 104, the ink system post would be the best selection. If there is no need for the 'writing' to be visible on the writing surface, the selection would be the dummy post. The embodiment of FIG. 3C includes camera (s) 302 and an associated lens 312, where the camera 302 and lens 312 are positioned to capture the writing surface without substantial interference from the post 314. In embodiments, the pen 200 may include multiple cameras 302 and lenses 312 such that more or all of the circumference of the tip 314 can be used as an input system. In an embodiment, the pen 200 includes a contoured grip that keeps the pen aligned in the user's hand so that the camera 302 and lens 312 remains pointed at the surface.

Another aspect of the pen 200 relates to sensing the force applied by the user to the writing surface with the pen 200. The force measurement may be used in a number of ways. For example, the force measurement may be used as a discrete value, or discontinuous event tracking, and compared against a threshold in a process to determine a user's intent. The user may want the force interpreted as a 'click' in the selection of an object, for instance. The user may intend multiple force exertions interpreted as multiple clicks. There may be times when the user holds the pen 200 in a certain position or holds a certain portion of the pen 200 (e.g. a button or touch pad) while clicking to affect a certain operation (e.g. a 'right click'). In embodiments, the force measurement may be used to track force and force trends. The force trends may be tracked and compared to threshold limits, for example. There may be one such threshold limit, multiple limits, groups of related limits, and the like. For example, when the force measurement indicates a fairly constant force that generally falls within a range of related threshold values, the microprocessor 210 may interpret the force trend as an indication that the user desires to maintain the current writing style, writing tip type, line weight, brush type, and the like. In the event that the force trend appears to have gone outside of a set of threshold values intentionally, the microprocessor may interpret the action as an indication that the user wants to change the current writing style, writing tip type, line weight, brush type, and the like. Once the microprocessor has made a determination of the user's intent, a change in the current writing style, writing tip type, line weight, brush type, and the like may be executed.

In embodiments, the change may be noted to the user (e.g. in a display of the HWC 102), and the user may be presented with an opportunity to accept the change.

Figures 4A, 4B, 4C:
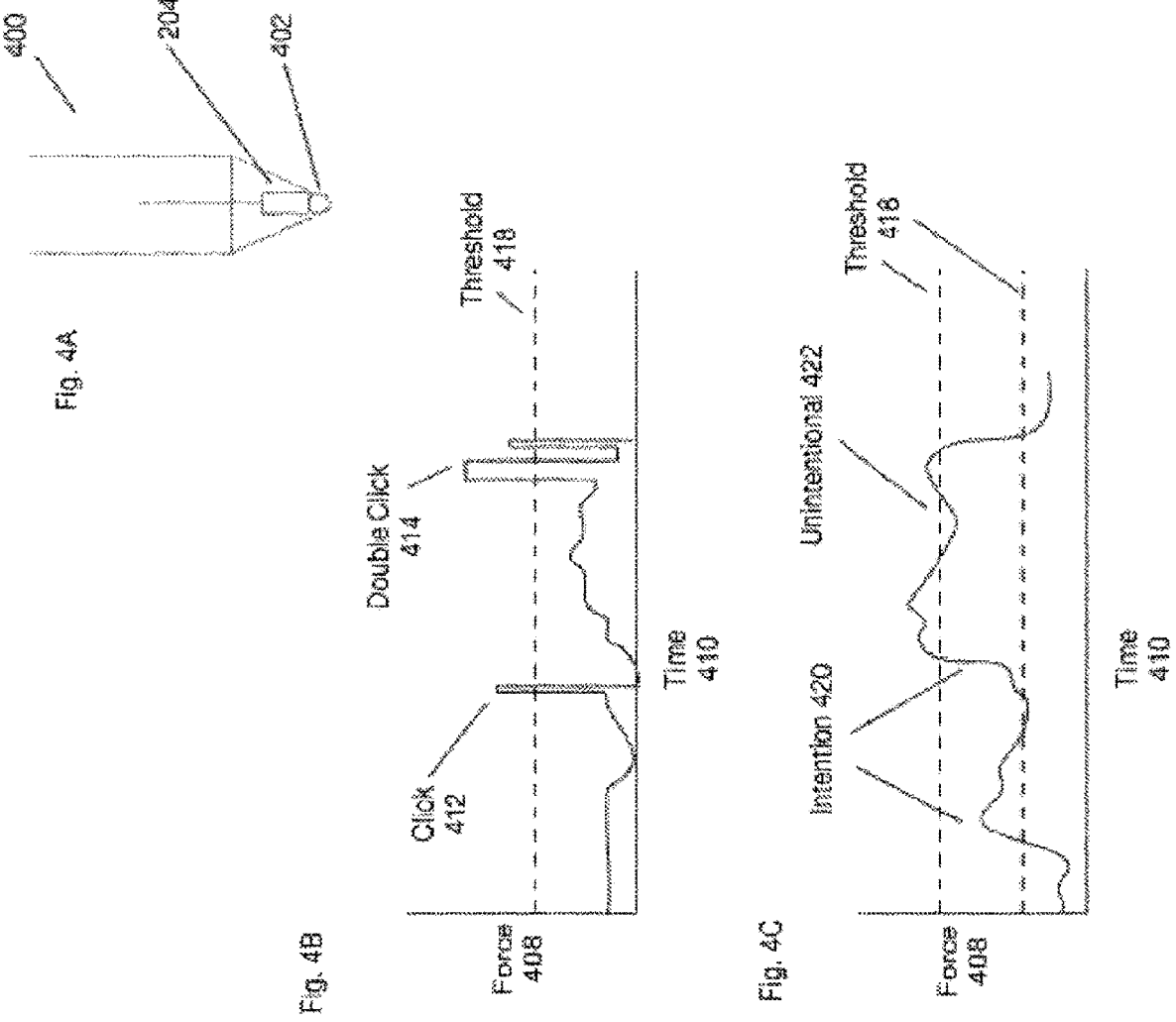
FIGS. 4a to 4c illustrate force interpretation systems in accordance with the principles of the present invention.

FIG. 4A illustrates an embodiment of a force sensing surface tip 400 of a pen 200. The force sensing surface tip 400 comprises a surface connection tip 402 (e.g. a lens as described herein elsewhere) in connection with a force or pressure monitoring system 204. As a user uses the pen 200 to write on a surface or simulate writing on a surface the force monitoring system 204 measures the force or pressure the user applies to the writing surface and the force monitoring system communicates data to the microprocessor 210 for processing. In this configuration, the microprocessor 210 receives force data from the force monitoring system 204 and processes the data to make predictions of the user's intent in applying the particular force that is currently being applied. In embodiments, the processing may be provided at a location other than on the pen (e.g. at a server in the HWC system 100, on the HWC 102). For clarity, when reference is made herein to processing information on the microprocessor 210, the processing of information contemplates processing the information at a location other than on the pen. The microprocessor 210 may be programmed with force threshold(s), force signature(s), force signature library and/or other characteristics intended to guide an inference program in determining the user's intentions based on the measured force or pressure. The microprocessor 210 may be further programmed to make inferences from the force measurements as to whether the user has attempted to initiate a discrete action (e.g. a user interface selection 'click') or is performing a constant action (e.g. writing within a particular writing style). The inferencing process is important as it causes the pen 200 to act as an intuitive external user interface 104.

FIG. 4B illustrates a force 408 versus time 410 trend chart with a single threshold 418. The threshold 418 may be set at a level that indicates a discrete force exertion indicative of a user's desire to cause an action (e.g. select an object in a GUI). Event 412, for example, may be interpreted as a click or selection command because the force quickly increased from below the threshold 418 to above the threshold 418. The event 414 may be interpreted as a double click because the force quickly increased above the threshold 418, decreased below the threshold 418 and then essentially repeated quickly. The user may also cause the force to go above the threshold 418 and hold for a period indicating that the user is intending to select an object in the GUI (e.g. a GUI presented in the display of the HWC 102) and 'hold' for a further operation (e.g. moving the object).

While a threshold value may be used to assist in the interpretation of the user's intention, a signature force event trend may also be used. The threshold and signature may be used in combination or either method may be used alone. For example, a single-click signature may be represented by a certain force trend signature or set of signatures. The single-click signature(s) may require that the trend meet a criteria of a rise time between x any y values, a hold time of between a and b values and a fall time of between c and d values, for example. Signatures may be stored for a variety of functions such as click, double click, right click, hold, move, etc. The microprocessor 210 may compare the real-time force or pressure tracking against the signatures from a signature library to make a decision and issue a command to the software application executing in the GUI.

FIG. 4C illustrates a force 408 versus time 410 trend chart with multiple thresholds 418. By way of example, the force trend is plotted on the chart with several pen force or pressure events. As noted, there are both presumably intentional events 420 and presumably non-intentional events 422. The two thresholds 418 of FIG. 4C create three zones of force: a lower, middle and higher range. The beginning of the trend indicates that the user is placing a lower zone amount of force. This may mean that the user is writing with a given line weight and does not intend to change the weight, the user is writing. Then the trend shows a significant increase 420 in force into the middle force range. This force change appears, from the trend to have been sudden and thereafter it is sustained. The microprocessor 210 may interpret this as an intentional change and as a result change the operation in accordance with preset rules (e.g. change line width, increase line weight, etc.). The trend then continues with a second apparently intentional event 420 into the higher-force range. During the performance in the higher-force range, the force dips below the upper threshold 418. This may indicate an unintentional force change and the microprocessor may detect the change in range however not affect a change in the operations being coordinated by the pen 200. As indicated above, the trend analysis may be done with thresholds and/or signatures.

Generally, in the present disclosure, instrument stroke parameter changes may be referred to as a change in line type, line weight, tip type, brush type, brush width, brush pressure, color, and other forms of writing, coloring, painting, and the like.

Another aspect of the pen 200 relates to selecting an operating mode for the pen 200 dependent on contextual information and/or selection interface(s). The pen 200 may have several operating modes. For instance, the pen 200 may have a writing mode where the user interface(s) of the pen 200 (e.g. the writing surface end, quick launch buttons 222, touch sensor 220, motion based gesture, and the like) is optimized or selected for tasks associated with writing. As another example, the pen 200 may have a wand mode where the user interface(s) of the pen is optimized or selected for tasks associated with software or device control (e.g. the HWC 102, external local device, remote device 112, and the like). The pen 200, by way of another example, may have a presentation mode where the user interface(s) is optimized or selected to assist a user with giving a presentation (e.g. pointing with the laser pointer 224 while using the button(s) 222 and/or gestures to control the presentation or applications relating to the presentation). The pen may, for example, have a mode that is optimized or selected for a particular device that a user is attempting to control. The pen 200 may have a number of other modes and an aspect of the present invention relates to selecting such modes.

Figure 5A:
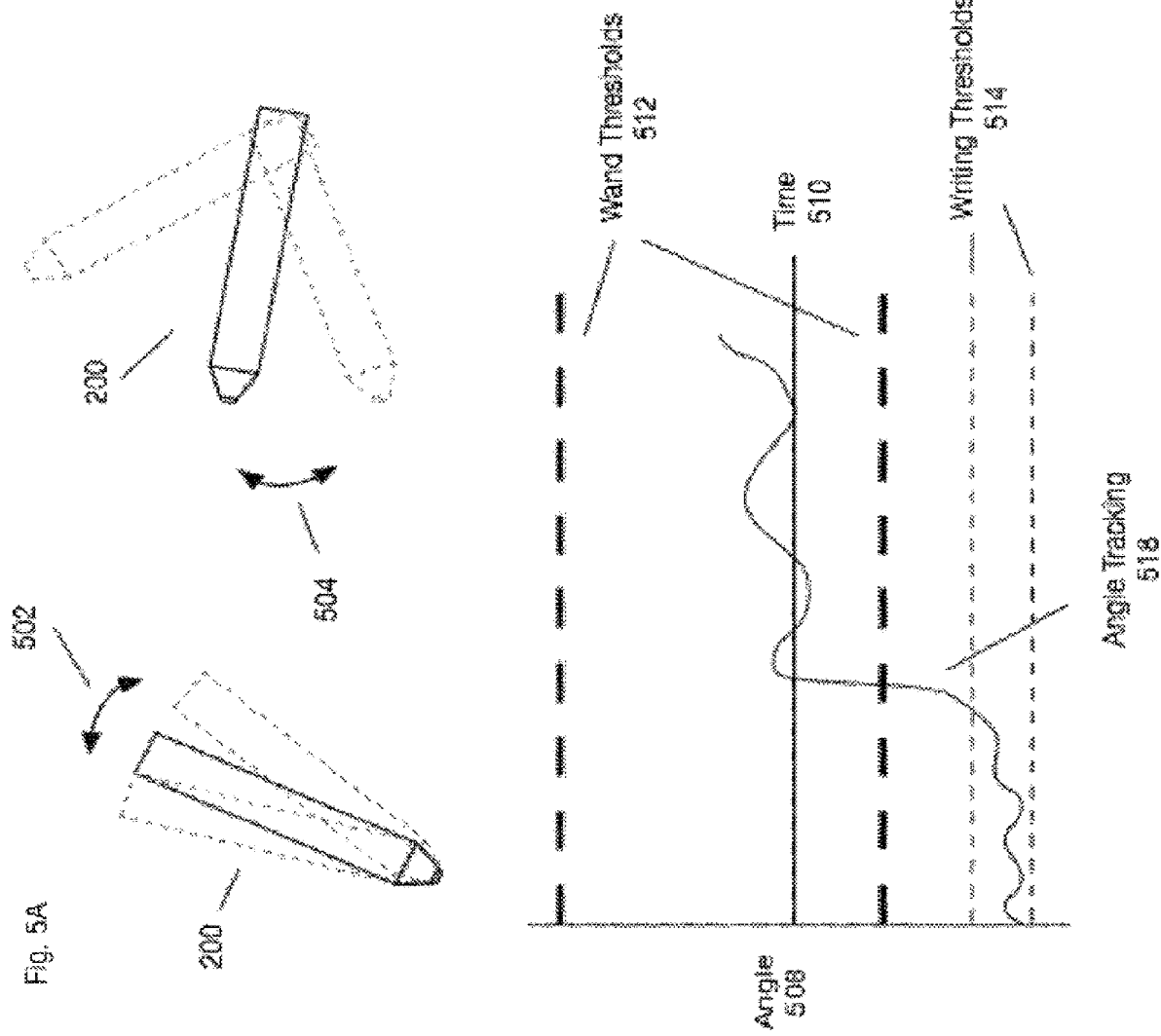
FIGS. 5a to 5c illustrate user interface mode selection systems in accordance with the principles of the present invention.

FIG. 5A illustrates an automatic user interface(s) mode selection based on contextual information. The microprocessor 210 may be programmed with IMU thresholds 514 and 512. The thresholds 514 and 512 may be used as indications of upper and lower bounds of an angle 504 and 502 of the pen 200 for certain expected positions during certain predicted modes. When the microprocessor 210 determines that the pen 200 is being held or otherwise positioned within angles 502 corresponding to writing thresholds 514, for example, the microprocessor 210 may then institute a writing mode for the pen's user interfaces. Similarly, if the microprocessor 210 determines (e.g. through the IMU 212) that the pen is being held at an angle 504 that falls between the predetermined wand thresholds 512, the microprocessor may institute a wand mode for the pen's user interface. Both of these examples may be referred to as context based user interface mode selection as the mode selection is based on contextual information (e.g.

position) collected automatically and then used through an automatic evaluation process to automatically select the pen's user interface(s) mode.

As with other examples presented herein, the microprocessor 210 may monitor the contextual trend (e.g. the angle of the pen over time) in an effort to decide whether to stay in a mode or change modes. For example, through signatures, thresholds, trend analysis, and the like, the microprocessor may determine that a change is an unintentional change and therefore no user interface mode change is desired.

Figures 5B, 5C:
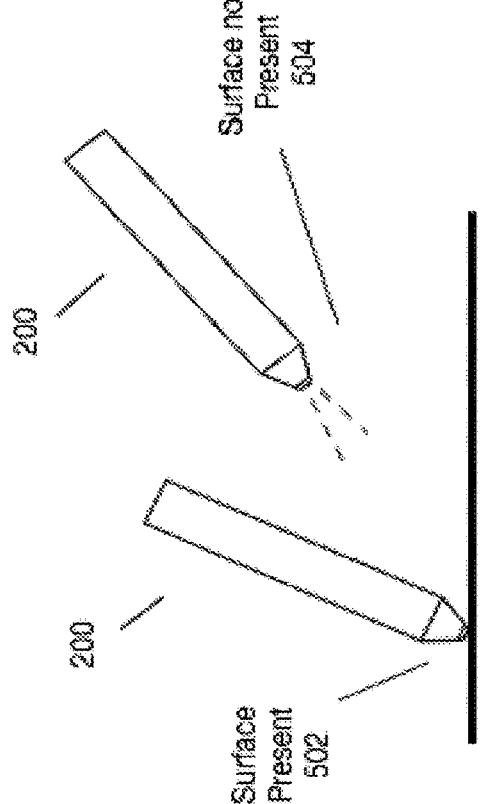

FIG. 5B illustrates an automatic user interface(s) mode selection based on contextual information. In this example, the pen 200 is monitoring (e.g. through its microprocessor) whether or not the camera at the writing surface end 208 is imaging a writing surface in close proximity to the writing surface end of the pen 200. If the pen 200 determines that a writing surface is within a predetermined relatively short distance, the pen 200 may decide that a writing surface is present 502 and the pen may go into a writing mode user inteface(s) mode. In the event that the pen 200 does not detect a relatively close writing surface 504, the pen may predict that the pen is not currently being used to as a writing instrument and the pen may go into a non-writing user interface(s) mode.

FIG. 5C illustrates a manual user interface(s) mode selection. The user interface(s) mode may be selected based on a twist of a section 508 of the pen 200 housing, clicking an end button 510, pressing a quick launch button 222, interacting with touch sensor 220, detecting a predetermined action at the pressure monitoring system (e.g. a click), detecting a gesture (e.g. detected by the IMU), etc. The manual mode selection may involve selecting an item in a GUI associated with the pen 200 (e.g. an image presented in the display of HWC 102).

In embodiments, a confirmation selection may be presented to the user in the event a mode is going to change. The presentation may be physical (e.g. a vibration in the pen 200), through a GUI, through a light indicator, etc.

Figure 6:
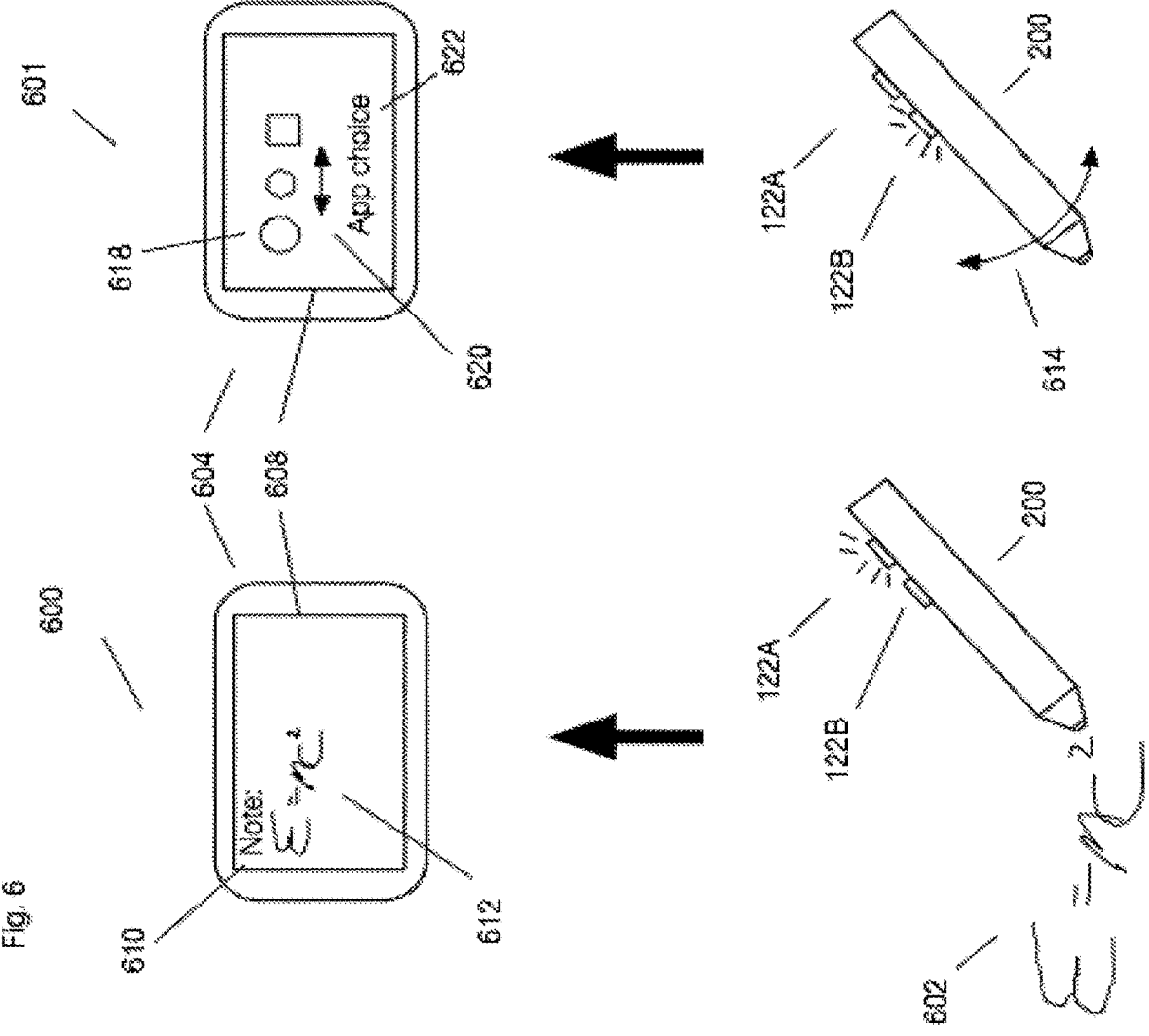
FIG. 6 illustrates interaction systems in accordance with the principles of the present invention.

FIG. 6 illustrates a couple pen use-scenarios 600 and 601. There are many use scenarios and we have presented a couple in connection with FIG. 6 as a way of illustrating use scenarios to further the understanding of the reader. As such, the use-scenarios should be considered illustrative and non-limiting.

Use scenario 600 is a writing scenario where the pen 200 is used as a writing instrument. In this example, quick launch button 122A is pressed to launch a note application 610 in the GUI 608 of the HWC 102 display 604. Once the quick launch button 122A is pressed, the HWC 102 launches the note program 610 and puts the pen into a writing mode. The user uses the pen 200 to scribe symbols 602 on a writing surface, the pen records the scribing and transmits the scribing to the HWC 102 where symbols representing the scribing are displayed 612 within the note application 610.

Use scenario 601 is a gesture scenario where the pen 200 is used as a gesture capture and command device. In this example, the quick launch button 122B is activated and the pen 200 activates a wand mode such that an application launched on the HWC 102 can be controlled. Here, the user sees an application chooser 618 in the display(s) of the HWC 102 where different software applications can be chosen by the user. The user gestures (e.g. swipes, spins, turns, etc.) with the pen to cause the application chooser 618 to move from application to application. Once the correct application is identified (e.g. highlighted) in the chooser 618, the user may gesture or click or otherwise interact with the pen 200 such that the identified application is selected and launched. Once an application is launched, the wand mode may be used to scroll, rotate, change applications, select items, initiate processes, and the like, for example.

In an embodiment, the quick launch button 122A may be activated and the HWC 102 may launch an application chooser presenting to the user a set of applications. For example, the quick launch button may launch a chooser to show all communication programs (e.g. SMS, Twitter, Instagram, Facebook, email, etc.) available for selection such that the user can select the program the user wants and then go into a writing mode. By way of further example, the launcher may bring up selections for various other groups that are related or categorized as generally being selected at a given time (e.g. Microsoft Office products, communication products, productivity products, note products, organizational products, and the like).

Figure 7:
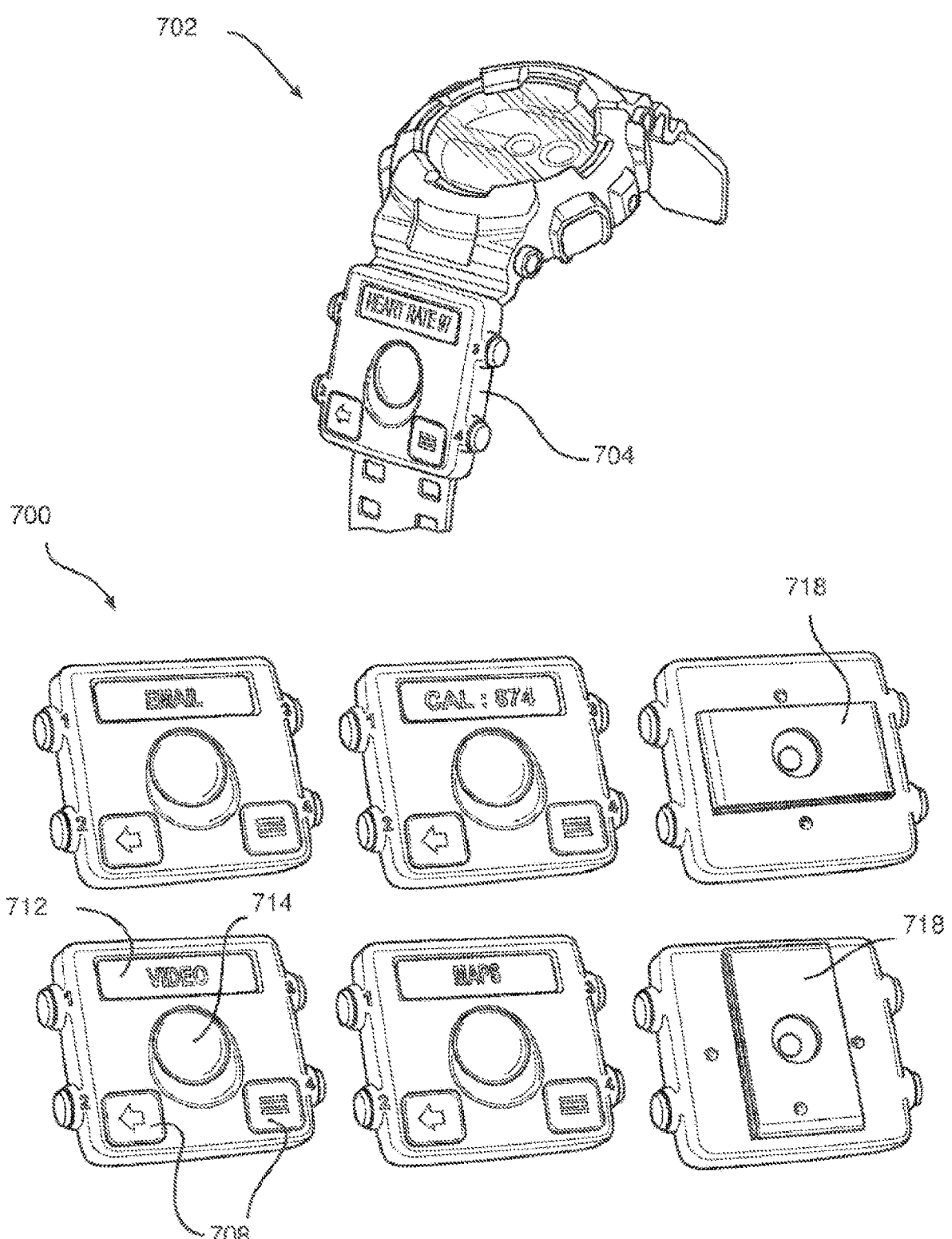
FIG. 7 illustrates external user interfaces in accordance with the principles of the present invention.

FIG. 7 illustrates yet another embodiment of the present invention. FIG. 7 illustrates a watchband clip on controller 700. The watchband clip on controller may be a controller used to control the HWC 102 or devices in the HWC system 100. The watchband clip on controller 700 has a fastener 718 (e.g. rotatable clip) that is mechanically adapted to attach to a watchband, as illustrated at 704.

The watchband controller 700 may have quick launch interfaces 708 (e.g. to launch applications and choosers as described herein), a touch pad 714 (e.g. to be used as a touch style mouse for GUI control in a HWC 102 display) and a display 712. The clip 718 may be adapted to fit a wide range of watchbands so it can be used in connection with a watch that is independently selected for its function. The clip, in embodiments, is rotatable such that a user can position it in a desirable manner. In embodiments the clip may be a flexible strap. In embodiments, the flexible strap may be adapted to be stretched to attach to a hand, wrist, finger, device, weapon, and the like.

In embodiments, the watchband controller may be configured as a removable and replacable watchband. For example, the controller may be incorporated into a band with a certain width, segment spacing's, etc. such that the watchband, with its incorporated controller, can be attached to a watch body. The attachment, in embodiments, may be mechanically adapted to attach with a pin upon which the watchband rotates. In embodiments, the watchband controller may be electrically connected to the watch and/or watch body such that the watch, watch body and/or the watchband controller can communicate data between them.

The watchband controller may have 3-axis motion monitoring (e.g. through an IMU, accelerometers, magnetometers, gyroscopes, etc.) to capture user motion. The user motion may then be interpreted for gesture control.

In embodiments, the watchband controller may comprise fitness sensors and a fitness computer. The sensors may track heart rate, calories burned, strides, distance covered, and the like. The data may then be compared against performance goals and/or standards for user feedback.

Another aspect of the present invention relates to tracking pen movements with the assistance of a camera and displayed content in a HWC 102. In embodiments, content is presented in a see-through display of a head-worn computer to provide a virtual guide for the wearer who wants to make motions with a pen, finger, or other interface and have the motions interpreted for pattern recognition. As described in connection with pen embodiments disclosed herein elsewhere, an IMU or pen-tip camera may be used to monitor the motion of a pen in order to predict what patterns are being drawn. The IMU and/or pen tip camera may suffer from electronic or optical drift and the drift may cause inaccuracies in the pattern prediction. In embodiments, to augment the IMU and/or pen tip camera motion predictions the virtual guide is provided to compensate for the drift. The pen motions may be captured by a camera on-board the HWC 102 while the wearer is writing with the guidance of the virtual line. Knowing that the wearer is using the virtual line as a guide, the relative position between the pen tip and virtual line can be used to reduce or eliminate drift issues.

In embodiments, digital content is presented to a wearer of the HWC 102 and the wearer moves the pen 200 along a writing surface guided by the digital content for pattern recordation, recognition and presentation assistance. In embodiments, a camera in the HWC 102 images and tracks the positions of the pen 200 for pattern recordation and recognition assistance. In embodiments, both the digital content and the camera capturing the pen positions are used for pattern recordation and recognition assistance. In embodiments, the digital content, camera capture, in-pen camera capture, in-pen IMU, etc. may be used in combination for pattern recordation and recognition assistance. In embodiments, the relative positions of the pen strokes to the virtual line may be presented in the HWC 102 displays in relation to the virtual line. For example, the wearer of the HWC 102 may be scribing without ink in relation to the virtual line that he perceives and as presented in the HWC 102 display, the on-board HWC 102 camera may capture the scribing, a processor may interpret the imaged scribing in relation to the line such that the scribing can be converted into digital content to be displayed in the HWC 102 display in relation to the virtual line.

Figure 8:
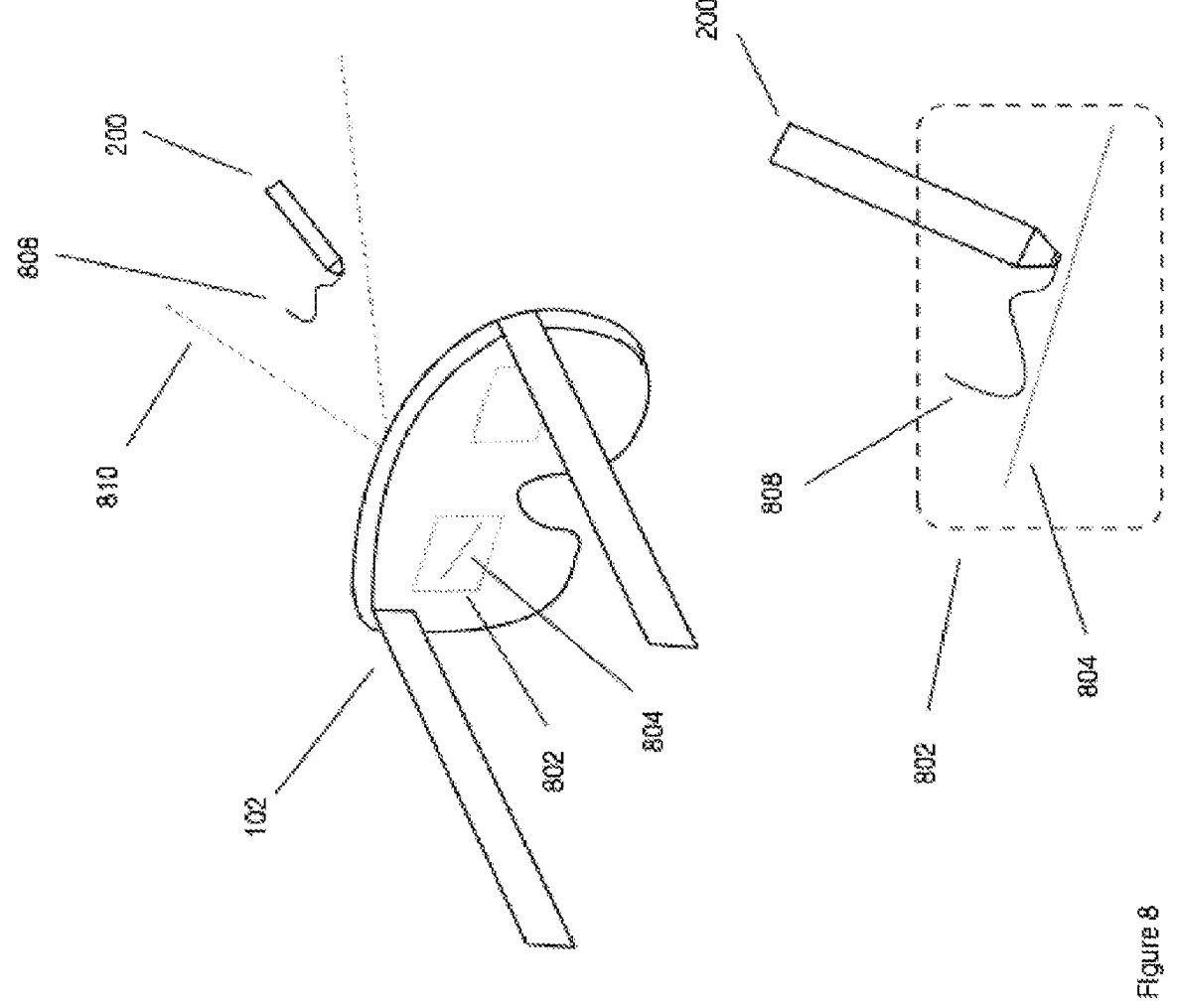
FIG. 8 illustrates a pattern recognition system and process in accordance with the principles of the present invention.

FIG. 8 illustrates a system where a camera in the HWC 102 is used to track pen 200 motions and digital content is presented to the wearer of the HWC 102 to assist the wearer with writing within a structure. In this embodiment, digital content in the form of a line 804 is presented in an FOV 802 of the HWC 102. The wearer can see through the FOV 802 so the line 804 appears to augment the surrounding environment's view for the wearer. The line may be 'fixed' to a spot in the environment such that when the wearer turns his head and hence changes the position of the HWC 102, the line appears to stay in position with respect to the environment. In embodiments, the camera in the HWC 102 may image the environment and track the relative movement of the HWC 102 with respect to the environment such that the line 804 can be positioned and moved within the FOV in accordance with the imaged movements to maintain visual alignment of the line with a point, object, marker, etc. in the environment. This configuration presents a virtual line in the environment that does not appear to move as the wearer's head moves. The virtual line can provide the wearer with guidance on where to make pen strokes. The line can be thought of as a line on a piece of paper so the wearer can write, or make strokes in a writing pattern, along the virtual line to make prediction of the lines pattern more accurate and overcome drift errors that may otherwise be apparent when attempting to record the movements and predict the patterns.

With the virtual line presented and virtually connected to a position in the environment, the wearer can use the line for guidance when making writing patterns. The HWC 102 camera can also be used to track the movements of the pen 200 relative to the position of the virtual line. This may be used to better predict the patterns indicated by the wearer's pen strokes. As described herein elsewhere, the pen 200 may track its motions through a pen tip camera and IMU. In embodiments, the pen tip camera and IMU may track the pen's motion and the camera may be used to track the motion of the pen relative to the virtual line. Each of these inputs may be used to track, record and predict what it being written.

In embodiments, the camera in the HWC 102 captures images of the wearer's pen's motion while the wearer is using the pen to make patterns with the virtual line as a guide. The virtual line may then be overlaid on the captured images of the motion to assist with the pattern analysis. In embodiments, once the overlay is made, one can see or analyze how the pen pattern moved with respect to the position of the virtual line as the wearer may be viewed the virtual line. The pattern analysis may involve interpreting the IMU motion detection, in-pen motion detection, and/or the pen's motion as captured through the HWC 102 camera relative to the virtual line. For example, if the IMU indicates that the pen shifted away from the wearer but the position of the pen relative to the virtual line indicates the pen was not moving, the portion of IMU data that indicated the shift may be discounted in the prediction analysis. The virtual line pattern analysis may be done in real-time, after the fact, etc. The pattern recognition may be done on a processor on-board the HWC 102, remote from the HWC 102, or partially on-board and remotely.

In embodiments, the virtual line may take any number of forms. For example, the virtual line may be a line, part of a virtual note, part of a virtual message template, etc. The line may also change positions and shapes depending on the wearer's needs. For example, the wearer may want to trace a pattern that is being displayed as digital content and the digital content may be presented as a consolidated image, part of an image, image in a line-by-line presentation format, etc. In embodiments, this system may be used for lessons on writing, painting, drawing, etc.

Another aspect of the present invention relates to the projection of imagery from a head-worn computer, wherein a projector with x-y mirror control and a solid state lighting system are mounted in the head-worn computer and positioned to project a raster style image onto a nearby surface.

Figure 9:
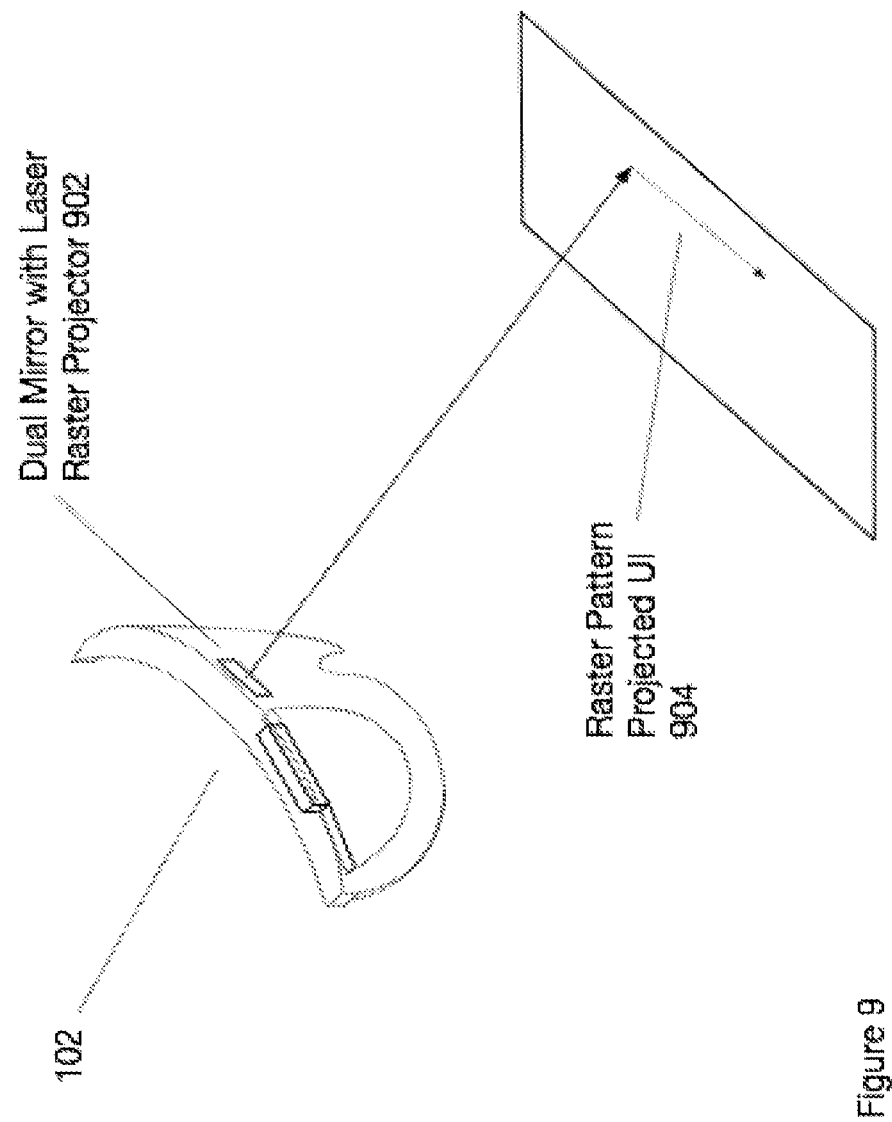
FIG. 9 illustrates a projection system in accordance with the principles of the present invention.

FIG. 9 illustrates a projection system according to the principles of the present invention. In embodiments, the HWC 102 has a micro-mirror projector 902 adapted to project a raster style beam of light to generate an image on a nearby surface. The micro-mirror projector 902 may include two movable mirrors for the x-y directional control of the light source or a single mirror that has movement on two independently controlled perpendicular axes for x-y directional control. The light source may be a monochromatic, multi-chromatic, dual color, tri color, multi-colored, or other arrangement. In the embodiments where multiple colors are used (e.g. red, green, and blue) the colors may be sequentially provided, simultaneously provided, or otherwise provided by a solid-state lighting system (e.g. LED, Laser, etc.). It should be understood that the term "raster" is being used herein as an example of a pattern that may be projected to produce the image on the nearby surface and it should not be considered limited to any one particular pattern unless otherwise stated. Further, while embodiments refer to a "nearby surface" it should be understood that this is also an example for the reader and that it should not be considered limited to any particular distance unless otherwise stated.

The micro-mirror projector 902 may project an image for display (e.g. a map, presentation, etc.), an interactive user interface for the HWC 102 (e.g. an interactive keyboard, cursor control interface, button, touch pad, etc.), an inter-active user interface for an external device 108, interactive content for multiple participants (e.g. a map, game, etc.).

In embodiments, an interactive user interface may be projected by the micro-mirror projector 902 and a sensor system may be included in the HWC 102 to make interpretations related to the intersection of the person with the image. For example, the sensor system may detect that the person has 'touched' the letter "a" on a projected keyboard and provide the detection information to a processor that determines that the person has 'pressed' the letter "a."

In embodiments, a sensor system may be included in the HWC 102 adapted to sense an interference when there is an object between the micro-projector 902 and a nearby surface and the interference information may be used to modify the projected image such that the projected image does not project onto the object. For example, the micro-mirror projector 902 may project a keyboard onto a nearby surface and when the user places their fingers over the keyboard the sensor system can detect the interference from the fingers and the projection can be modified such that the projection is dark, not emitted, in the area of the interference so the user's finger or hand does not have a projected image on it. In an example, the micro-projector can project the keyboard onto the surface. An image of the projected keyboard is captured by the camera in the HWC and this image is used as a baseline for comparison. Images are then captured periodically of the keyboard and compared to the baseline to determine whether fingers are present and where the fingers are located. The image of the projected keyboard is then modified to remove the portions of the keyboard where the fingers have been determined to be located.

In embodiments, the solid state light used in the micro-mirror projector is a non-visible laser or LED (e.g. NIR, IR), such that the projector projects an invisible image. The invisible image may be detected through the use of a matching non-visible light detector or camera. This may be used to prevent others from seeing what the user of the HWC 102 is seeing by providing the HWC 102 with the detector and then displaying visible image content in the see-through display of the HWC 102 that matches the non-visible radiation. This may also be used to project an image for someone else to see if they have a matching non-visible detector system.

In embodiments, the position of the projected image from the micro-mirror projector 902 is controllable through the HWC 102. The position, for example, may be settable through a user gesture, external control device, HWC 102 mounted interface, etc. In embodiments, the position is locked in place on the nearby surface. For example, once positioned, an adjacent object or a marker on or proximate the nearby surface may be used to 'key' the projected image to such that the projected image maintains a relative position on the nearby surface. In this case, the projected image is stabilized relative to the key, so that as the HWC moves, the projected image is moved within the display field of view to maintain a constant relative position to the key, this is also known as a world-locked image.

In embodiments, the micro-mirror projector 902 has an image stabilization system. The image stabilization system may move the micro-mirror projector 902 to compensate for sensed vibrations or other movements of the HWC 102 such that the projected image appears stably positioned on the nearby surface even when there are vibrations or movements (e.g. small movements) of the HWC 102.

An aspect of the present invention relates to a gyro-stabilized image projector with gimbaled mounts to provide a physically stabilized projection platform. In embodiments, the projection is world locked such that the projected image appears in a fixed position relative a surface, surface edge, marker, etc. The world locked projection maybe gyro-stabilized with a laser rasterized projection where an IMU is used to measure movements of the head-worn computer and then small motors (e.g. piezo electric motors) are used to stabilize the projector/raster mirror(s). In an alternate embodiment, the projected image passes through optics that include optical stabilization wherein the position of optical elements can be laterally moved to change the pointing direction of the projector in response to sensed movements of the HWC.

In addition to optical stabilization, the projected user interface may also be, or instead be, digitally stabilized. The digitally generated image of the projected user interface can be digitally shifted laterally across the projected field of view to stabilize the user interface as seen by the user. Provided the projected user interface (e.g. the keyboard) only occupies a portion of the projected field of view. For example, where the keyboard occupies 20 degrees of a 30 degree projected field of view, the projected image can be digitally stabilized for movements of +/−5 degrees by digitally shifting the image to compensate for detected movements. In embodiments, movement detection can be accomplished by detecting movements of the HWC or by detecting movements of objects in the camera's field of view or through a combination of both techniques.

Another aspect of the present invention relates to generating the projected image through a diffractive optical element. In embodiments, the IMU stabilized laser is arranged such that the user interface image is generated by the diffractive. The laser may be attached to the diffractive and the combined device may be pointed by actuators to align and stabilize the image. In embodiments, the diffractive is removable and replaceable such that the user can change what projected image is to be presented by the projector. For example, the HWC 102 may be provided with a set of diffractives, one for a keyboard, button, slider, etc. and each one may be removed and replaced in the HWC 102.

An aspect of the present invention relates to a projected or augmented reality content displayed user interface position and focal plane along with the focal plane for content resulting from an interaction with the user interface. For example, as described herein, a keyboard or other user interface may be projected from an HWC 102 onto a surface. The user may interact with the image that appears on the surface and the HWC 102 may have an interaction identification system (e.g. structured invisible wavelength light pattern recognition system, motion and distance sensor system, etc.) such that the interactions produce output (e.g. key strokes relating to keyboard interactions). The output, or response to the interactions, may be displayed in the see-through display of the HWC 102 at a position and at a focal plane that is in relation to the position and focal plane of the surface and area where the projected user interface is displayed. In embodiments, the position may be such that the resultant content does not overlap the user interface from the user's perspective. In embodiments the focal plane for the presentation of the resultant content and the user interface display surface may be different to form a workspace where the user can either focus on the user interface or the resultant content, but not both simultaneously. In embodiments, the position of the resultant content may be world-locked in relation to the projected user interface such that they appear to maintain a constant positional relation to one another from the user's perspective. This can be a useful arrangement for user's that are touch typers where they focus mainly on the resultant content but occasionally want to view the keyboard.

In other embodiments, the resultant content may be positioned and locked in a position near the projected or displayed user interface and have the same or similar focal plane as the user interface. This arrangement may be desirable for those users who like to look back and forth between the resultant content and the keys of a keyboard, for example.

In embodiments, the user may affirmatively control the position and focal plane of the resultant content relative to the projected or displayed user interface. The selections may be set as default settings, temporary settings, contextual settings (e.g. a selection based on the application being used in the HWC 102, a selection based on the surface in use for the reference projection or display, time of day, sensor feedback (e.g. if a motion sensor identifies motion a certain setting may be used), environmental conditions, etc.

In embodiments, the resultant content may be presented through a display other than the head-worn see-through display. For example, the user may want to display the content to other people, either proximate or remote from the user, so the user may elect to cause the resultant content to be presented on another system display.

Another aspect of the present invention relates to maintaining a proper shape of a projected or display user interface during movements of the HWC 102. In embodiments, the user interface is presented as a world-locked item, meaning it is positioned through a fixed reference to something in the surrounding environment such that it appears to be locked in place even as the user moves his head and eyes. In embodiments, the user interface is also stabilized such that relatively small movements of the user's head don't cause the user interface to appear to shake or move in an unwanted fashion from the user's perspective. In a further embodiment, the shape of the projected user interface may be monitored and adjusted to maintain its intended shape as to be viewed from the user's perspective (e.g. to correct for keystoning). For example, the surface or edges of the surface may be monitored for shape alignment and when the HWC 102 moves enough to cause the shape to otherwise change with respect to the surface reference, the projected user interface shape may be altered to maintain the properly aligned shape. In embodiments, active surface alignment may be accomplished through an imaging process where the camera in the HWC 102 is used to image the surface. In embodiments, the shape modifications may be accomplished based on a predictive system. For example, an IMU may monitor the movements of the HWC 102 and the IMU output may be used to predict the resulting changes in a projected user interface image such that the user interface image can be reshaped based on the movements. In embodiments, the shape management may involve both surface imaging and motion-based predictions. In embodiments, the projected or displayed user interface may further be digitally stabilized.

Another aspect of the present invention relates to cutting away a portion or all of a displayed or projected user interface based on movements of the HWC. In embodiments, the user interface is world locked and either a portion or the whole user interface will be cut off if the HWC 102 moves too much. For example, in the situation where a keyboard is being projected onto a surface and the keyboard is world-locked to the surface, a portion of the projected keyboard may be eliminated when the user turns his head to the side. This prevents the projector from projecting the image erroneously. The projector will only have a certain relatively small adjustable range to target the surface and once the end of the range is reached, for example, the projection can stop or the projected image can be altered in such a way that only a portion of the projected user interface still appears. When projecting a portion of the user interface in such a situation the content being projected may need to be altered. For example, as the right side of the projection is getting cut off, the digital content may be altered such that the left portion of the content continues to appear clear.

Another aspect of the present invention relates to world-locking a projected or displayed user interface based on a user presented marker. In embodiments, a user of a HWC 102 places a high contrast marker or makes a high contrast mark such that the HWC 102 has a reference for the world-locking of the user interface. In embodiments, the marker or mark may be intended to be used multiple times, such as a mark on a table top where the user periodically sits. In embodiments, the marker may be intended as a one time or limited time mark, such as a mark in the sand or on some surface that the user does not frequently visit. In embodiments, the marker or mark may be used to world-lock the user interface where the mark is directly associated with the placement for a portion of the user interface. In other embodiments, the marker or mark may be used as a remote reference for which the user interface will be referenced but which the user interface will not overlap. This can be useful in situations where the user wants to move the user interface on the surface. For example, the user interface may be projected in an original position and the HWC 102 may give the user the opportunity to move the user interface on the world-locking surface. The user may then use a gesture, such as touching the user interface projection and dragging it into the preferred position. Then the HWC may continue to use the mark or marker as a reference or if another marker is recognized as being available the new marker may be used.

In embodiments, the user generated marker is not visible to the human eye but can be detected by the HWC 102. For example, quantum dot ink or other infrared active material may be used to make a mark that is invisible to the human eye but is visible when viewed in infrared and the HWC 102 may include an infrared camera capable of detecting the infrared light emitted from the mark. The quantum dot ink or other infrared active material may fluoresce infrared light in response to visible light or near infrared light. Similarly, the mark may be visible in ultraviolet light but be invisible to the human eye, and the HWC then includes an ultraviolet camera.

Another aspect of the present invention relates to capturing user interactions with the projected or displayed user interface through a projection of structured light and capturing and interpreting changes in the structured light caused by user movements. In embodiments, the structured light is projected through a diffractive to generate a known pattern of light. The structured light projector may be built into the HWC 102, IMU stabilized and coordinated with the user interface projector to maintain an alignment with the projected user interface image. In embodiments, the structured light will cover the user interface such that physical interactions with the area involving the user interface can be identified and interpreted. The structured light is typically not visible to the user because it is can be a very busy pattern that would be distracting to the user. In embodiments, the HWC 102 includes a non-visible capture system (e.g. IR camera) to capture the structured light interference patterns.

In embodiments, a user's finger positions can be calibrated into the structured light system or stereo camera 3D imaging system by having the user start with all fingers in contact with the surface. By measuring the positions of the fingers in contact with the surface by using the structured light system or stereo camera 3D imaging system, a baseline position of the fingertips when in contact with the surface can be obtained. When a fingertip later reaches this baseline position, it can be interpreted as having contacted the surface and a keystroke or other input can be determined on the projected or displayed keyboard or user interface. This is particularly advantageous when the structured light or stereo camera 3D imaging system views the surface and the user's fingers from a perspective wherein the movements of the user's fingers are away or toward the HWC, because then the movements of the user's fingers are limited by the surface. The position and angle of the surface relative to the user interface can also be determined by using the structured light system or stereo camera 3D imaging system. The position and angle of the surface can be used to more accurately determine the baseline position of the fingers over the entire area of the projected or displayed keyboard or user interface so that keystrokes can be more accurately identified.

In embodiments, a displayed or projected user interface (e.g. a keyboard) and other displayed information are provided to the user in correspondence with the head pose of the user. Wherein the head pose is determined by the measured tilt of the HWC as determined by a tilt sensor associated with the HWC. In this case, the displayed or projected user interface is only provided when the user's head pose is at a selected angle or range of angles such as when the user's head is tilted downward by 30 degrees as is typical when using a laptop computer. When the user, raises their head above this tilt angle, the user interface is not provided and their finger movements are not tracked. If the user then tilts their head down again, the user interface is once again provided and their finger movements are tracked to determine their interactions with the user interface. In a similar fashion, the user interface can be provided when the user's head pose is within a selected lateral angle or range of angles and if the user moves their head laterally, the user interface is not provided. This method of providing the user interface only when the user's head pose is within a selected position, encourages the user to keep their head still as is typical when a person is typing or interacting with a graphical user interface. Although, it is within the scope of the invention to provide a stabilized displayed or projected user interface within the selected range of angles. In this way, a simplified method of world locking the user interface without having to track objects in the environment is provided. Instead, the method relies on tracking the head pose of the user within a selected range of angular movements to determine when a displayed or projected user interface is provided to the user. The method can also be provided as a mode that is selected by the user of the HWC. In addition, providing the user interface can be combined with the providing of other information that is displayed in the HWC when the user interface is not displayed. For example, when the user has their head tilted downward, the user interface can be displayed or projected and when the user tilts their head upward the other information is provided while the user interface is not provided.

In embodiments, the user interface is projected using non-visible light where the non-visible light is imaged by the user, or other user, and the user interface is then presented as an augmented reality overlay in the head-worn display. For example, the structured light could be provided at 940 nm (e.g. with an LED or laser diode), which can still be captured by a standard CMOS or CCD camera with the infrared cut filter removed. The keyboard could then be projected with 808 nm light (e.g. with an LED or laser diode) and captured with a standard camera. In embodiments, the image may be captured with the same camera and the images may be image processed to identify the different wavelength patterns. In other embodiments, this may be accomplished with two cameras wherein one camera is used to capture the structured light and the other camera is used to capture the projected image and each camera is blocked from light associated with the other image (e.g. by including a notch filter that transmits certain wavelengths of light while reflecting or absorbing other wavelengths of light).

In embodiments, the structured light pattern and projected user interface are world locked, stabilized, and image shape corrected in a coordinated fashion to maintain proper alignment between the two and such that proper identification of user interactions can be identified as properly aligned with the user interface elements. For example, both the structured light projector and user interface projector may be physically stabilized (e.g. as described herein), digitally stabilized (e.g. as described herein) and shape corrected to compensate for head movements (e.g. as described herein).

In embodiments, IMU's are attached to the back of a user's hand, finger, and or knuckles to detect finger movements and surface contact by detecting sharp stops in movement. This can provide a more detectible key contact to go along with detection of finger movements with systems.

Another aspect of the present invention relates to capturing user interactions with a projected or displayed content user interface through 3D imagery of the user's fingers as captured by two separated cameras mounted on a head worn computer. For example, a camera may be mounted on ends of the front facing side of the HWC 102 (e.g. near the glasses lenses) and the two cameras may simultaneously capture video of the user's fingers while the user is interacting with a projected or content displayed user interface (e.g. a projected keyboard. or AR content displayed. keyboard). As the cameras capture the images, the images from the separate cameras can be processed to generate a 3D model of the user's movements such that interactions with the projected or display user interface (e.g. virtual interface) can be determined. In embodiments, the dual separated cameras may capture other user body part movements such that they can be interpreted as 3D gesture commands.

Another aspect of the present invention relates to technologies for launching a projected or displayed user interface. In embodiments, the user interface may be activated (e.g. projected or displayed) based on an affirmative user action, contextual information or other information. For example, if the user launches a software application on the head-worn computer that interoperates with a particular type of user interface (e.g. a keyboard, button, mouse, touch pad), the user interface may be presented to the user automatically. In embodiments, the user interface may be presented when appropriate during the experience with the software application. For example, if the user launches an email application, the user may automatically be presented with a 'reader's' user interface such as a projected or displayed touch pad. The user may use the touch pad to interact with the email program to assist in reading, scrolling, moving to another email, etc. The user may also use the touch pad to reply or start a new email, which is an action that may cause the user interface to alter and include a keyboard to facilitate the input of text. In other embodiments, the user may use another external user interface to launch the projected or displayed user interface. For example, the user may have a pen or watch interface (as described herein) and the pen or watch may be adapted to launch the projected or displayed user interface. The user may then use the pen or watch for certain interactions and then quick launch an additional user interface (e.g. a projected or displayed keyboard). The user may also use a user interface mounted on the head-worn computer to launch the projected or displayed interface.

Another aspect of the present invention relates to an invisible user interface that can be viewed by the user of a head-worn computer. In embodiments, the user interface is an infrared fluorescing printed keyboard (e.g. printed with quantum dot ink or infrared active ink) wherein the ink fluoresces in the infrared after being exposed to visible light or near infrared light. The light from the infrared fluorescing printed keyboard, or other user interface or image, can be captured by an infrared camera or hyperspectral camera in the HWC, along with finger movement. Since the printed keyboard is under the user's fingers, the fingers don't interfere with the keyboard image. Stereo cameras or structured light can be used to determine finger movements as has been discussed previously herein. Examples of suitable infrared inks include: http://www.maxmax.com/aXRayIRInks.asp IR1 ink absorbs below 793 nm and emits at 840 nm; or http://www.diversifiednano.com/i-series.aspx x-nano IR-783 absorbs in the visible and emits at 783 nm.

In a further embodiment, user interactions with the projected or displayed user interface or printed user interface are captured with a time of flight camera system that is associated with the HWC. Where the time of flight camera projects a short burst of light (e.g. infrared light) onto the user hands and the associated area of the user interface. Light reflected from the user's hands and the associated area of the user interface or keyboard is then captured for a very short period of time by the time of flight camera. The relative distance between the time of flight camera and portions of the user's hands and portions of the associated area of the user interface is then determined from the relative brightness of the different portions of the image of the scene as captured by the time of flight camera. As such, the time of flight camera provides a depth map of the user's hands and the associated area of the user interface. Changes in the depth map are used to determine the movements of the user's hands in relation to the user interface.

Another aspect of the present invention relates to a vehicle-specific external user interface 104. In embodiments, the vehicle-specific external ("VSE") user interface 104 includes a mechanical mounting system adapted to mount the VSE interface 104 on the steering wheel of the vehicle. The mounting system may secure the VSE interface in a position that tends to be near the driver's hands, such as on the wheel portion around the 1:00 to 3:00 position or 9:00 to 11:00 position. The VSE interface may be secured with a Velcro style system, clip, strap, etc. In embodiments, the VSE interface is adapted to provide the driver with a system for the interaction with the HWC 102 when driving where the interactions are intended to enhance the driver's driving experience. For example, a driver may preset applications, screens, content sets, etc. for access while he is driving and the VSE interface may provide a physical interface for the launching of an application, toggling, switching, or changing applications or screens or content sets, etc. The presentation of display content controlled by the VSE interface may involve navigation, vehicle systems, point-of-interest information, advertisements, etc. and the driver may be able to switch between the applications very quickly through the interaction of a button or more than one button. In embodiments, the preset screens, content sets, or applications may be launched through dedicated quick launch buttons. For example, the navigation application button may be in the upper right of the VSE interface.

In embodiments, a pre-programmed button or set of buttons may be set to clear the display of the HWC 102 to be free of content or reduce the amount of content that is otherwise displayed to increase the driver's see-through view of the surroundings. The button(s) may be set to switch content display modes between two pre-determined content types relating to the vehicle (e.g. switching between pre-set driving applications). The button(s) may be set to change the amount of content-free area in the field-of view of the HWC 102. The button(s) may be set to move content within the field-of-view. The button(s) may be set to change the HWC 102 display brightness and contrast or control other aspects of the HWC 102, such as to change audio volume, sensor settings, etc. While many embodiments refer to the use of "button(s)" it should be understood that this is for simplicity in illustration only and that other forms of user controllable interfaces are envisioned by the present invention, such as switches, toggles, touch screens, touch pads, etc.

Figure 10:
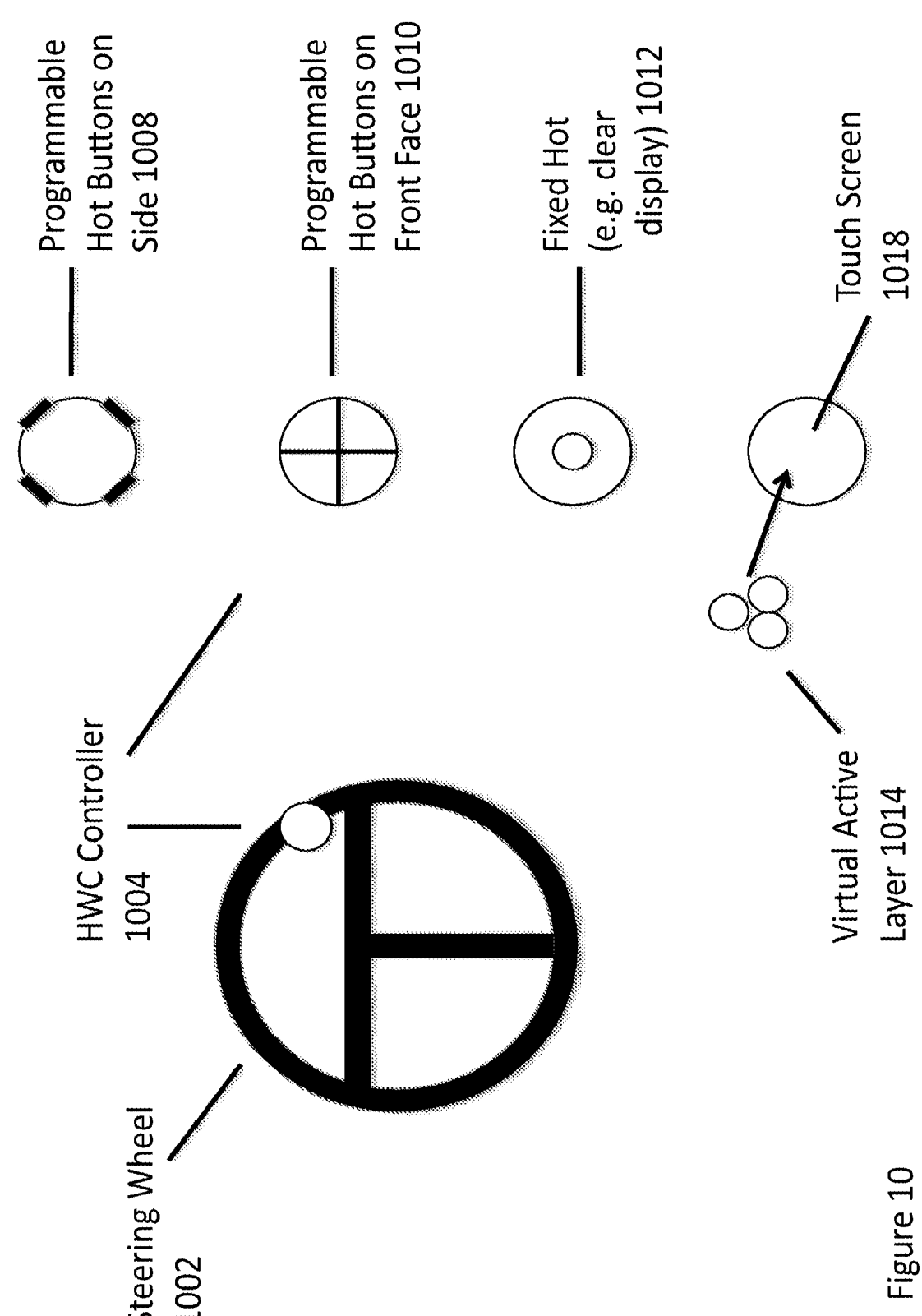
FIG. 10 illustrates an external user interface adapted to be used with a steering wheel, in accordance with the principles of the present invention.

FIG. 10 illustrates several VSE interfaces according to the principles of the present invention. The VSE interface 1004 is illustrated as being mounted on the steering wheel 1002 and illustrated in various control configurations. The VSE interface may have hot or launch buttons on the side 1008, front face 1010 or otherwise such that the driver can touch and interact with them while driving. The VSE interface may also have a fixed hot button 1012 to perform a dedicated function such as clearing the display of the HWC 102 of content or limiting the type or amount of content that is permitted to be displayed in the display. The VSE interface may also have one or more touch pads or screens. A touch pad or screen may, for example, be used as a button style interface as well as a cursor control style interface. The VSE interface may also be virtually modified with a virtual active layer 1014. The virtual active layer 1014 may be presented as digital content in the display of the HWC 102 and be locked in position with respect to the physical VSE interface such that the driver perceives the virtual content as augmenting the physical VSE interface. For example, virtual button labels may be provided as digital content and overlaid or set next to the VSE interface such that the driver perceives the labels as being associated with the buttons. The virtual content may be used in coordination with a new command set. For example, a new command set relating to navigation may be set on the HWC 102 and a label or image may be set to appear in a position locked to the VSE interface. In embodiments, there may not be a physical button and the interaction that causes a control command may be initiated when the user virtually interacts with the content by touching a portion of the VSE controller that intersects, from the driver's perspective through the display, with the virtual content.

An aspect of the present invention relates to a user interface with a quick launch interface adapted to quickly launch an application, portion of an application, function, display control command, head-worn computer function, etc. In embodiments, an external user interface for a head-worn device is provided (e.g. as described herein elsewhere) and the external user interface includes a button, switch, touch pad, etc. that when actuated (e.g. the button pressed), an action is initiated on the head-worn computer (e.g. launching or activating a software application or clearing the see-through display). In embodiments, the external user interface may be in a form of a pen, pen attachment, watch, watch attachment, application specific device (e.g. steering wheel attachment), programmable device, mouse, wireless finger mounted mouse, phone, music player, etc. (some of which are described herein elsewhere).

As a further example of an external user interface that includes a quick launch activation system, a finger mounted wireless controller (also generally referred to as a wireless finger mouse, wireless air mouse or WAM) may be provided. The WAM may include a gyro and/or inertial movement detection system (e.g. an IMU) and such system may communicate signals or commands to the head-worn computer based on its movements. This system may be used to interpret gestures, continuously control the movement of a mouse element on the see-through display, control a view of content being displayed on the see-through display, etc. The WAM may also be mechanically adapted to be mounted on a person's finger (e.g. the index finger) such that its buttons and other physical interfaces can be controlled with the person's thumb. The quick launch physical interface (e.g. button) may be positioned on the WAM such that the thumb can actuate it. Once actuated, the program, action, function, etc. associated with the interface may be initiated.

The quick launch system and associated head-worn computer may be configured such that quick launch commands are not acted upon or modified before being executed based on a situation aware system, head-worn computer setting, external user interface setting, etc. For example, the head-worn computer may include sensors that collect information that may be interpreted to determine an activity (e.g. a forward speed may be calculated and, in a case where the speed is over 10 mph, it may be determined that the person is driving in a car), and the commands may be ignored or modified based on the activity. In the event that the situation demands a clear view of the surroundings (e.g. driving a car), a quick launch command that would otherwise cause content to be presented in the see-through display may be ignored or the content displayed may be modified to maintain a high degree of see through. In certain situations, this can prevent an obscured view by an inadvertent activation of the quick launch command. In a similar fashion, a quick launch button's commands may be altered or otherwise interpreted to cause a predetermined action based on the situation or setting. For example, irrespective of the command associated with the quick launch interface, activation of the interface may cause the clearing of content from the see-through interface when the situation appears to demand a clear view of the surrounding. As described elsewhere herein, the quick launch interface may be programmed to cause the see-through display to clear or substantially clear (e.g. only displaying content towards an edge of the display such that it is 'out of the way' of the surrounding view).

In embodiments, the quick launch system may be adapted to launch an application, function, display control command, etc. when the actuator is interacted with in a particular way and then send a different command when the interaction is terminated. For example, the system may be adapted to cause content to be displayed in the see-through display only when a button is held. When the button is released, the content may be removed. This system allows the user to only display content when he has activated the interface and he can quickly remove the content, by releasing, when he is done with the content or wants a clear view of the surroundings. In embodiments, the system may be programmed in reverse (i.e. content is removed with the button is held). The quick launch system may be programmable and/or pre-programmed to set which actuation system on the external device is used and what the pattern of interaction that causes the action is. In embodiment, an actuator may be programmed to cause the launch command after the actuator is held for a period of time, actuated multiple times (e.g. double click), or other interaction pattern.

In embodiments, the quick launch system may have a 'hold' function where a predetermined interaction causes the launch and then a second predetermined action causes a cancellation of the launch or modification of the launch. For example, a double click of the actuator may cause the display of content in the see-through display and a second double click or a single click may cause the removal of the content from the see-through display.

Another aspect of the present invention relates to an auto-adapting graphical user interface presented on an external user interface device 104 adapted for the control of software applications operating on a HWC 102. The auto-adapting graphical user interface receives information from the HWC 102 pertaining to one or more applications operating on the HWC 102 and then the graphical user interface is changed to meet the requirements of the application(s) that are running. The adaptation is tailored to assist the user in interacting with the application(s). For example, if a text-based application is being presented to the user in the see-through display of the HWC 102, the auto-adaptable graphical user interface may be changed to a touch based keyboard. In the event that a game is operating on the HWC 102 the auto-adaptable graphical interface may change to a game controller. In embodiments, feedback from sensor systems in the external user interface device 104 may be used differently depending on the application operating on the HWC 102. For example, when reading on the HWC 102 tilting the angle of the external user interface device 104 may cause the page to scroll, but when the HWC is presenting a game, the tilt feedback may change the way an object in the game is affected.

Figure 11:
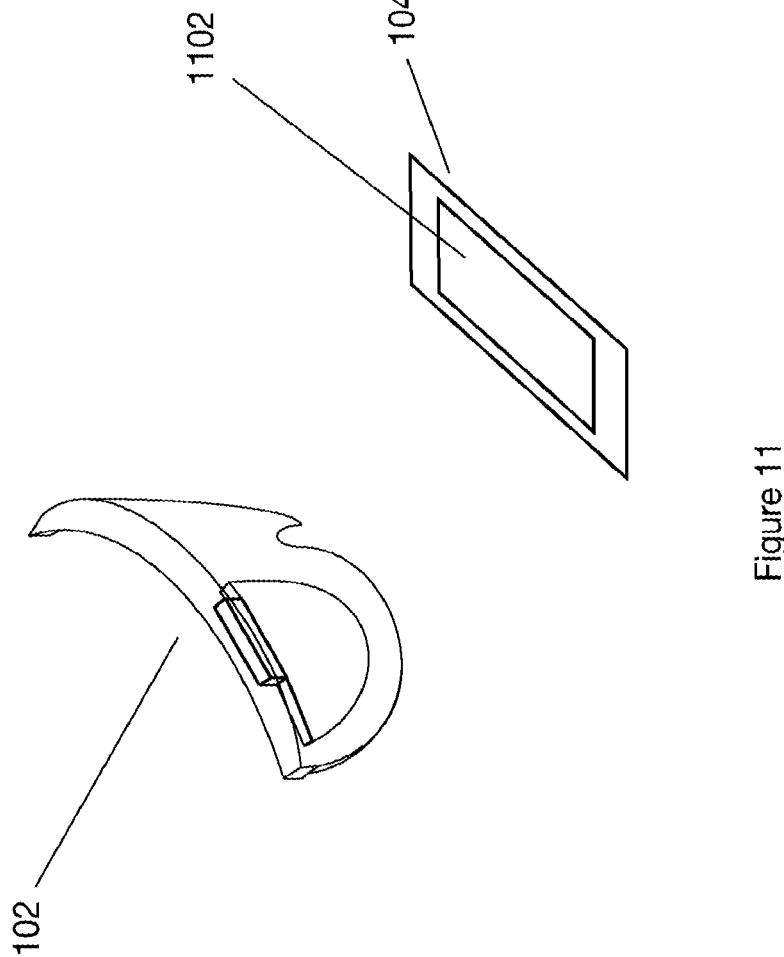
FIG. 11 illustrates a dual screen user interface in accordance with the principles of the present invention.

FIG. 11 illustrates an external user interface device 104 with an auto-adaptable graphic user interface 1102 in bi-directional communication with a HWC 102. As the illustration indicates, a user of the HWC 102 can see through to the environment and see the external device 104 with the auto-adaptable graphical user interface at the same time the user is viewing digital content present on the see-through displays of the HWC 102. The inventors discovered that this arrangement makes for an intuitive way to control applications operating on the HWC 102 while minimizing the amount of user interface information that gets presented in the see-through displays. For example, when controlling a text-based application, the field of view of the HWC 102 does not have to include any UI elements or the number of elements may be minimized because the user can still see the control elements on the external user interface device 104. There are instances when the HWC 102 does include UI control elements even with the auto-adaptable graphical user interface 1102. For example, if a cursor or other such element may be needed and the cursor may be presented in the see-through display of the HWC 102 while the adaptable graphical user interface 1102 converts automatically into a touch based or movement based mouse.

In embodiments, the external user interface device 104 may be a hand-held device with a touch screen and a processor, wherein the processor is adapted to present graphical information on the touch screen and interpret user interactions with the touch screen (e.g. a touch screed on a phone, tablet, dedicated device, etc.). The hand-held device processor further adapted to receive an indication, from the head-worn computer, of an operating program of out of a plurality of computer programs the head-worn computer processor is currently operating and presenting to the user.

The hand-held device processor may be further adapted to change the graphical information on the touch screen based on the indication of operating program such that the touch screen presents a pre-determined user interface on the touch screen that meets the needs of the operating program. In embodiments, the HWC has its own, separate from the processor in the external user control device, processor operating the applications on the HWC. In embodiments, the GUI on the external user control device presents indications (e.g. icons) of available programs to be operated on the HWC where a selection of the indication initiates the corresponding program on the HWC. In embodiments, the GUI on the external user control device presents several applications that are already running on the HWC such that one or more may be selected to be interacted with in the HWC. In embodiments, the GUI on the external user control device provides a control element adapted to switch the external user control device back into a standalone device that no longer controls the HWC. For example, if the external user control device is a phone or other multi-purpose device (i.e. controller for the HWC and adapted to perform functions unrelated to the HWC) the control element may change the device back into a phone.

Another aspect of the present invention relates to a finger mounted external user interface (i.e. a type of external user interface 104) with a sensor positioned and adapted to sense the presence of a user's finger. The sensor can provide feedback to an on-board processor of the finger mounted external user interface and the processor can adjust the interface's functionality based on the presence or non-presence of the finger. In embodiments, the sensor facilitated system can act like a 'dead man switch' where the interface stops controlling a related device (e.g. HWC) when no finger is detected. This can prevent unintentional operation. For example, if a user of a HWC 102 has connected an finger interface to the HWC 102 such that the finger interface controls aspects of the HWC 102 and the user dismounts the interface and puts it down (e.g. on a table or seat) it won't inadvertently control the HWC 102 because no finger will be detected. In embodiments, such a finger control interface may also have a security system such that only authorized users can properly use the interface to control a related device. For example, the finger controller may have a touch pad and the touch pad may be adapted to image or otherwise read a fingerprint for authorization. In embodiments, the user may have a predetermined period to mount the device after proper authorization. For example, the user may have his finger print authorized and then have ten seconds to mount the device such that the finger sensor senses the presence of a finger.

A finger mounted user interface device according to the principles of the present invention may have a housing adapted to be mounted on a finger of a user; a finger touch sensor positioned to touch the finger of the user, when the finger mounted user interface is worn by the user; and the finger touch sensor may be in communication with a processor in the finger mounted user interface, wherein the processor may regulate a function of the finger mounted user interface based on the finger touch sensor's indication of a presence or non-presence of the finger of the user.

The processor may be further adapted to communicate control commands to a head-worn computer. The housing may include a strap to further secure the housing to the finger of the user. The processor may be further adapted to control a head-worn computer when the finger touch sensor's indication is that a finger is present. The processor may be further adapted to stop controlling a head-worn computer when the finger touch sensor's indication is that a finger is not present. The finger touch sensor may be a capacitively activated sensor, mechanically activated sensor, proximity sensor, etc. The function regulated by the processor may control a function based on inertial measurements indicative of movements of the device. The function regulated by the processor may control a function based on movements of the device.

Figure 12:
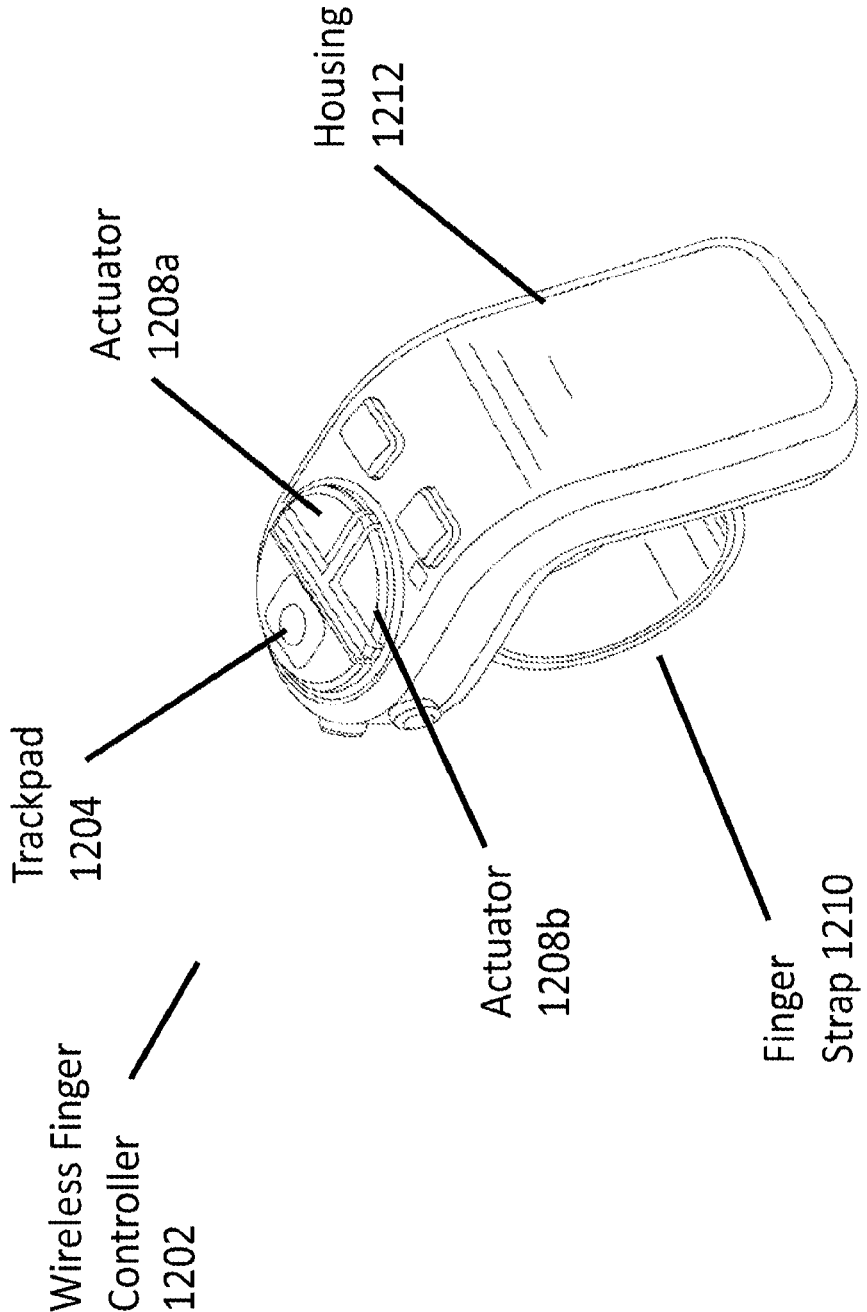
FIG. 12 illustrates a wireless finger mountable controller in according to the principles of the present invention.

FIG. 12 illustrates a wireless finger mounted controller 1202 in accordance with the principles of the present invention. The controller 1202 has a housing 1212 mechanically adapted to sit on top of a finger (e.g. the index finger). The housing includes a strap 1210 that can be slipped over the finger to secure the housing 1212 on the finger. With the controller 1202 mounted on the user's finger, the user may use his thumb, or other digit, to interact with the various components on the controller (e.g. track pad 1204, actuators 1208a and 1208b or actuators on the front of the device). The user may also interact with the controller 1202 and hence generate control signals for a related device (e.g. HWC 102) by moving the controller in 2D or 3D space. Gyros, inertial measurement units (IMUs), etc. in the controller 1202 may detect user movements to generate the control signals.

Figure 13:
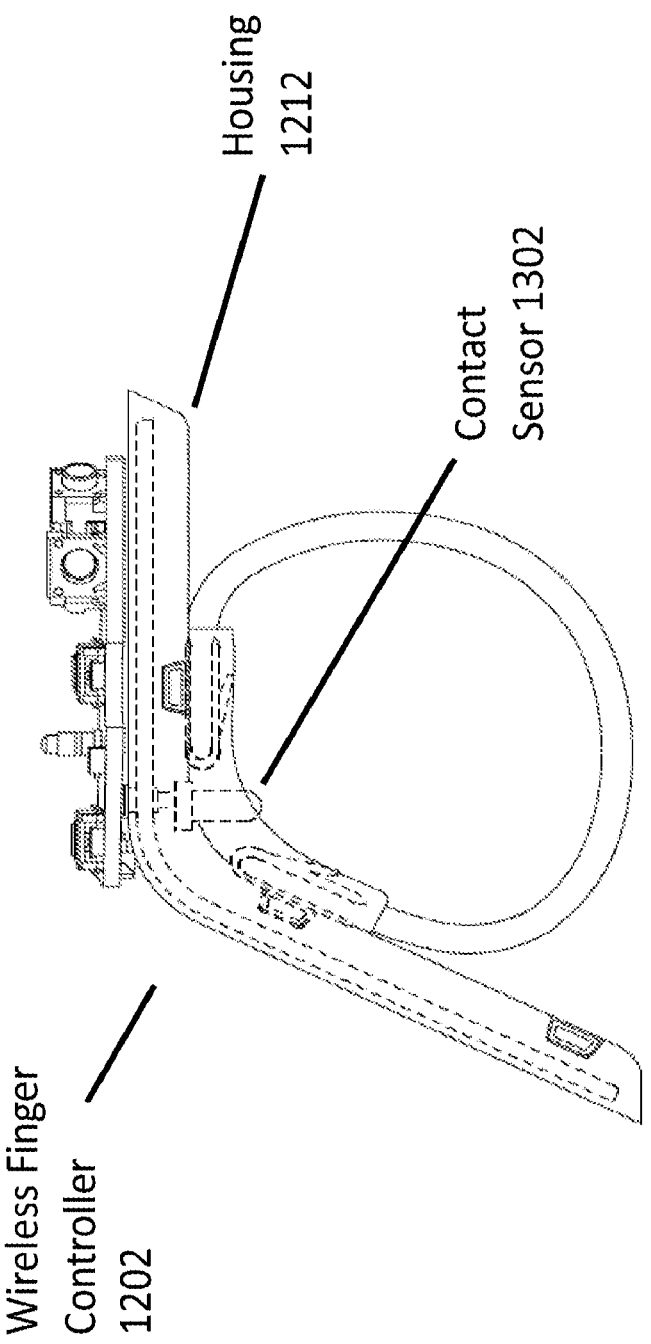
FIG. 13 illustrates a wireless finger mountable controller with a finger contact sensor in according to the principles of the present invention.

FIG. 13 illustrates a side view of the controller 1202 with internal portions in dashed lines. The top of the housing 1212 is also removed in this view to expose the circuit board on top and some of the internal components. As illustrated, a contact sensor 1302 may extend through the housing 1212 into the region where the user's finger fits. The contact sensor 1302 may be a capacitive touch sensor, mechanical touch sensor, etc. The contact sensor may be adapted to sense the presence or non-presence of the user's finger. A processor in the controller 1202 may be connected to the contact sensor 1304 such that the processor can alter functionality of the controller 1202 based on the presence or non-presence of the user's finger. For example, the controller may be shut off or its controlling functions may be turned off if no finger is detected.

Figure 14:
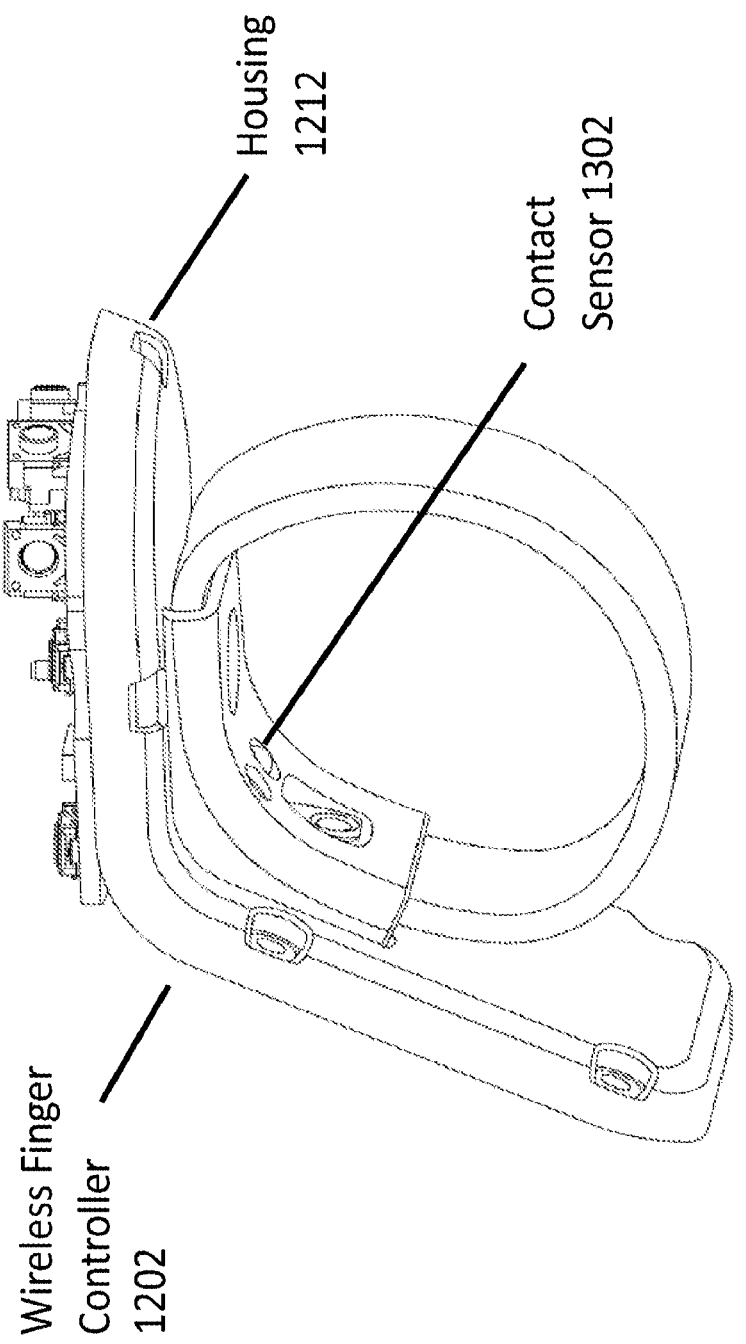
FIG. 14 illustrates a wireless finger mountable controller with a finger contact sensor in according to the principles of the present invention.

FIG. 14 illustrates another view of the finger controller 1202 showing the contact sensor 1302 extending through the housing 1212. In embodiments, a proximity sensor may be positioned inside of the housing such that the sensor does not extend through the housing while still sensing a finger within its proximity.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

The invention claimed is:

1. A system comprising:
   a wearable device;
   one or more light sources;
   one or more sensors; and
   one or more processors configured to communicate with the wearable device, the one or more light sources, and the one or more sensors;
   wherein the one or more processors are configured to perform a method comprising:
       outputting, by the one or more light sources, a light pattern comprising non-visible light;

determining, via the one or more sensors, a tilt angle of the wearable device;
in accordance with a determination that the tilt angle is within a predefined angle range, outputting, by the one or more light sources, a visible light pattern, the visible light pattern aligned with the light pattern;
in accordance with a determination that the tilt angle is not in the predefined angle range, forgoing outputting the visible light pattern; and
determining a position of a user's finger based on the non-visible light, of the light pattern, reflected by the user's finger and received by the one or more sensors.

2. The system of claim 1, wherein the method further comprises determining, via the one or more sensors, a movement of the user's finger.

3. The system of claim 2, wherein the method further comprises:
   determining whether a sharpness of the movement exceeds a threshold;
   in accordance with a determination that the sharpness exceeds the threshold, presenting an input signal corresponding to the determined position of the user's finger; and
   in accordance with a determination that the sharpness does not exceed the threshold, forgoing presenting the input signal.

4. The system of claim 3, wherein the input signal is associated with one or more of a keyboard input signal, a mouse input signal, a button input signal, and a touch pad input signal.

5. The system of claim 3, wherein the input signal comprises a gesture input signal.

6. The system of claim 1, wherein the method further comprises determining, via the one or more sensor, a contact of the user's finger with a surface.

7. The system of claim 1, wherein the visible light pattern is outputted on a surface.

8. The system of claim 1, wherein the visible light pattern is associated with a user interface.

9. The system of claim 8, wherein the one or more processors are further configured to communicate with a display, the display configured to present a user interface element associated with the user interface.

10. The system of claim 8, wherein the one or more processors are further configured to communicate with a transmissive display, the user interface configured to be presented to the user via the transmissive display.

11. The system of claim 1, wherein the one or more sensors comprise an inertial measurement unit.

12. The system of claim 1, wherein the wearable device comprises a wearable head device.

13. A method comprising:
   outputting, by one or more light sources, a light pattern comprising non-visible light; determining, via one or more sensors, a tilt angle of a wearable device;
   in accordance with a determination that the tilt angle is within a predefined angle range, outputting, by the one or more light sources, a visible light pattern, the visible light pattern aligned with the light pattern;
   in accordance with a determination that the tilt angle is not in the predefined angle range, forgoing outputting the visible light pattern; and
   determining a position of a user's finger based on the non-visible light, of the light pattern, reflected by the user's finger and received by the one or more sensors.

14. The method of claim 13, further comprising determining, via the one or more sensors, a movement of the user's finger.

15. The method of claim 14, further comprising:

determining whether a sharpness of the movement exceeds a threshold;

in accordance with a determination that the sharpness exceeds the threshold, presenting an input signal corresponding to the determined position of the user's finger; and in accordance with a determination that the sharpness does not exceed the threshold, forgoing presenting the input signal.

16. The method of claim 13, further comprising determining, via the one or more sensor, a contact of the user's finger with a surface.

17. The method of claim 13, wherein the visible light pattern is associated with a user interface.

18. The method of claim 17, further comprising presenting, via a display, a user interface element associated with the user interface.

19. The method of claim 17, presenting, via a transmissive display, the user interface.

20. A non-transitory computer-readable medium storing instructions which, when executed by one or more processors, cause the one or more processors to perform a method comprising:

outputting, by one or more light sources, a light pattern comprising non-visible light;

determining, via one or more sensors, a tilt angle of a wearable device;

in accordance with a determination that the tilt angle is within a predefined angle range, outputting, by the one or more light sources, a visible light pattern, the visible light pattern aligned with the light pattern;

in accordance with a determination that the tilt angle is not in the predefined angle range, forgoing outputting the visible light pattern; and determining a position of a user's finger based on the non-visible light, of the light pattern, reflected by the user's finger and received by the one or more sensors.

\* \* \* \* \*